United States Patent
Fukushima

(10) Patent No.: US 8,994,983 B2
(45) Date of Patent: Mar. 31, 2015

(54) IMAGE PROCESSING APPARATUS, IMAGE PROCESSING METHOD, IMAGE PROCESSING SYSTEM, AND STORAGE MEDIUM

(75) Inventor: Kenta Fukushima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1168 days.

(21) Appl. No.: 12/493,222

(22) Filed: Jun. 28, 2009

(65) Prior Publication Data
US 2010/0002255 A1    Jan. 7, 2010

(30) Foreign Application Priority Data
Jul. 1, 2008 (JP) .................................. 2008-172244

(51) Int. Cl.
G06F 15/00 (2006.01)
H04N 1/00 (2006.01)
H04N 1/32 (2006.01)

(52) U.S. Cl.
CPC ....... *H04N 1/00206* (2013.01); *H04N 1/00214* (2013.01); *H04N 1/0022* (2013.01); *H04N 1/32048* (2013.01); *H04N 2201/0093* (2013.01)
USPC ......................................... 358/1.15; 358/1.1

(58) Field of Classification Search
CPC .......... H04N 1/00206; H04N 1/00214; H04N 1/0022; H04N 1/32048; H04N 2201/0093
USPC .................................. 358/1.1, 1.15
See application file for complete search history.

(56) References Cited

U.S. PATENT DOCUMENTS

| | | | | |
|---|---|---|---|---|
| 7,656,550 B2* | 2/2010 | Yoshioka | ...................... | 358/1.15 |
| 2003/0023748 A1* | 1/2003 | Takemoto et al. | ............ | 709/238 |
| 2004/0215472 A1* | 10/2004 | Gleckman | ......................... | 705/1 |
| 2009/0067414 A1* | 3/2009 | Toscano et al. | ............... | 370/353 |

FOREIGN PATENT DOCUMENTS

| | | | |
|---|---|---|---|
| JP | 11-220601 A | 8/1999 | |
| JP | 2004-064693 A | 2/2004 | |
| JP | 2006-222635 | * 8/2006 | .............. H04N 1/00 |
| JP | 2006-222635 A | 8/2006 | |

OTHER PUBLICATIONS

English translation of JP 2006-222635.*

* cited by examiner

*Primary Examiner* — King Poon
*Assistant Examiner* — Iriana Cruz
(74) *Attorney, Agent, or Firm* — Canon USA, Inc. IP Division

(57) ABSTRACT

An image processing apparatus connected to a network in which a plurality of devices having a transmission request reception function for transmitting a transmission-requested image to a designated destination is installed and including an address book used for registering destination data indicating the designated destination includes an address registration unit configured to register, in the address book, transmission request destination data designating one of the plurality of devices and the destination data in association with each other, an address designation unit configured to designate the destination data registered by the address registration unit, an image designation unit configured to designate an image to be transmitted, and a transmission unit configured to transmit the image designated by the image designation unit and the destination data designated by the address designation unit to the device designated by the transmission request destination data associated with the destination data.

15 Claims, 27 Drawing Sheets

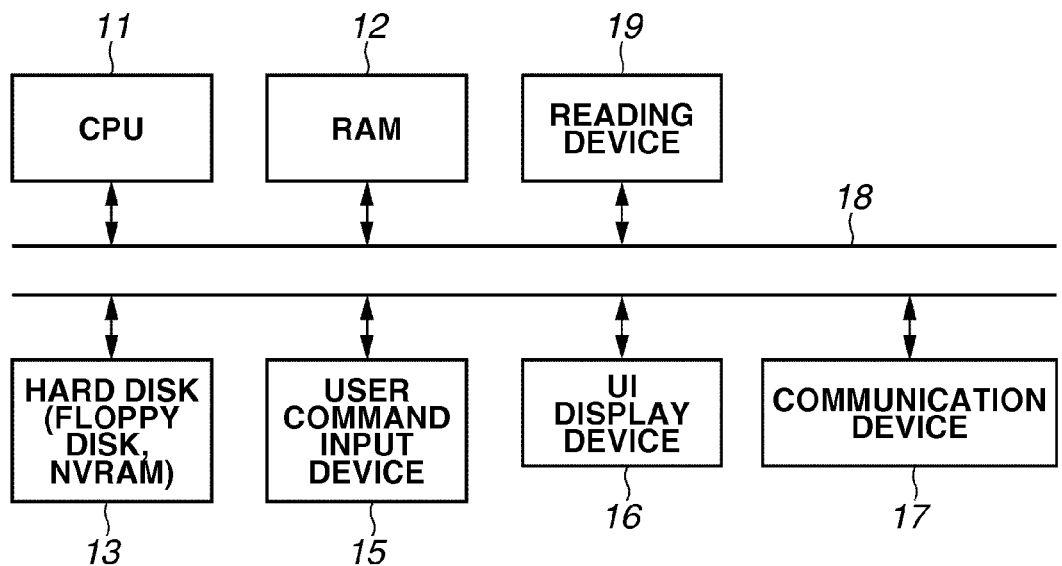
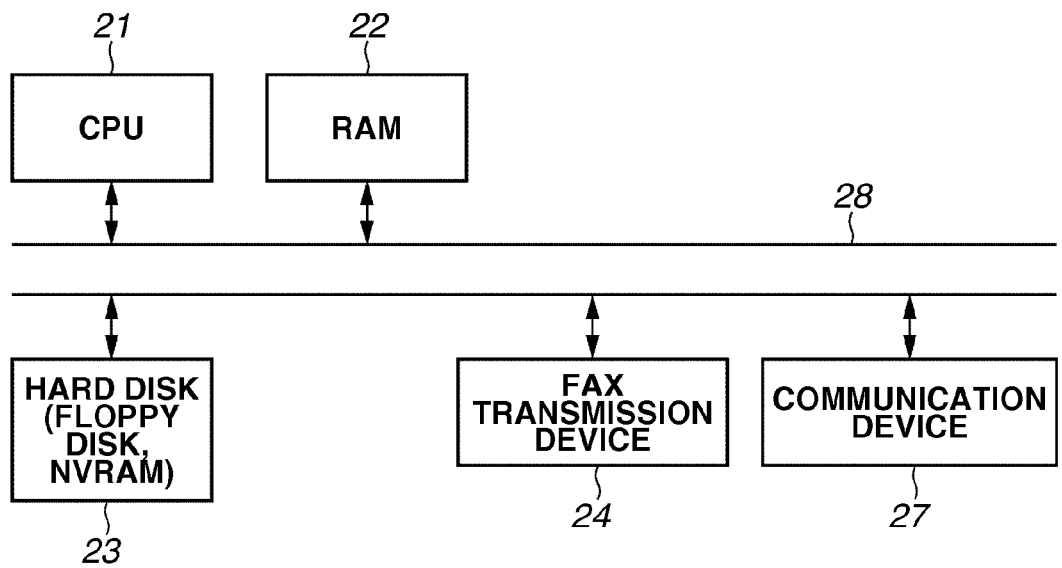

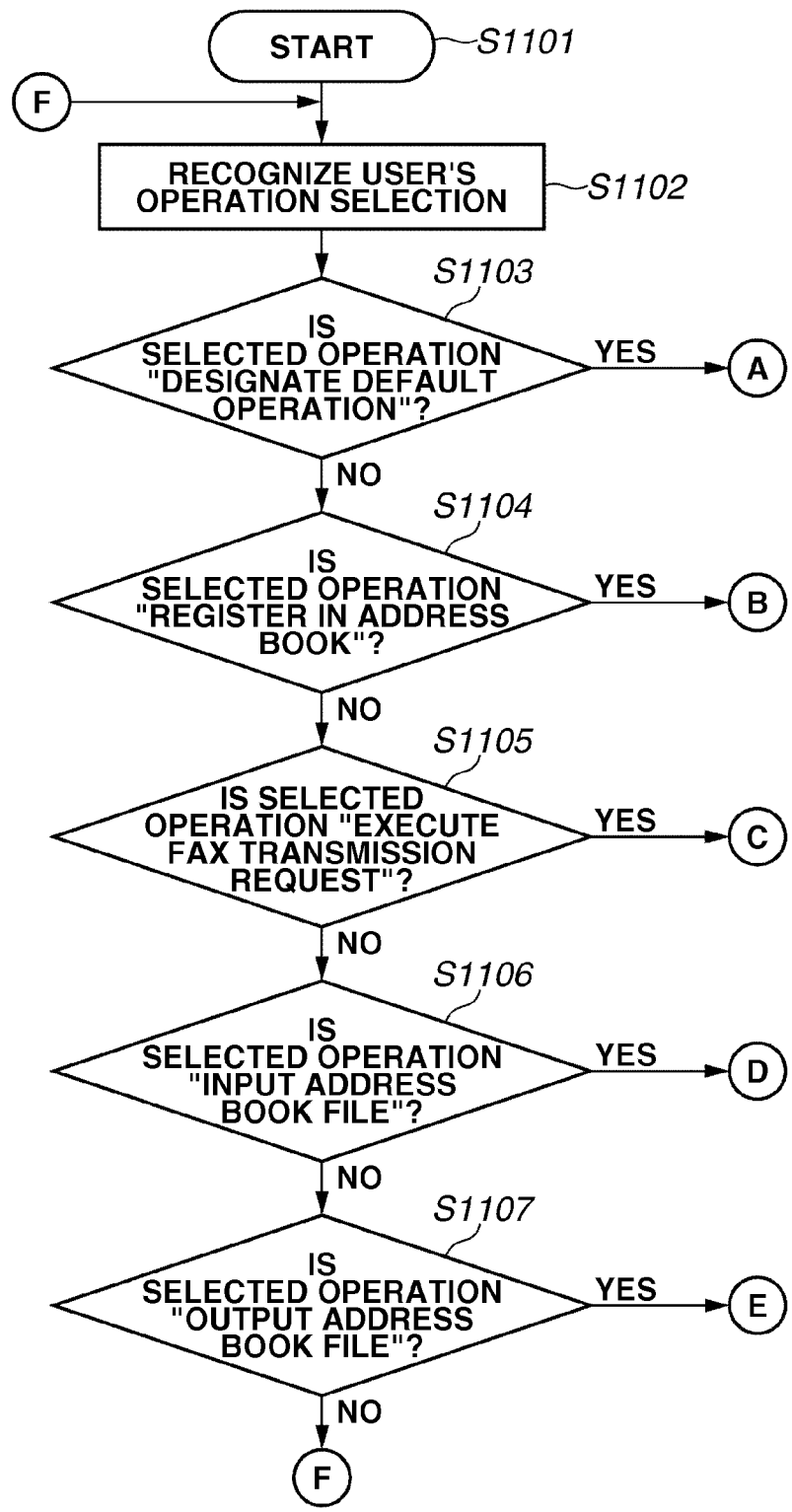

FIG.10

SELECT OPERATION TO BE PERFORMED WHEN IMPORTING ADDRESS BOOK FILE

103 — ◯ IMPORT ADDRESS DIRECTLY

102 — ☐ CHANGE ADDRESS ALLOWING ISSUING TRANSMISSION REQUEST TO OTHER THAN OWN MACHINE TO ADDRESS NOT ALLOWING ISSUING TRANSMISSION REQUEST

101 — ☐ DO NOT IMPORT ADDRESS ALLOWING ISSUING TRANSMISSION REQUEST TO OTHER THEN OWN MACHINE

[ CANCEL ] [ INPUT COMPLETED ]

FIG.17

REGISTER ADDRESS

FAX ADDRESS

TELEPHONE NUMBER [            ]

TRANSMISSION REQUEST DESTINATION OTHER THAN SPECIFIC ADDRESS BOOK CLIENT

FAX TRANSMITTER IP [            ]

LINE NUMBER [            ]

[CANCEL] [NEXT] [INPUT COMPLETED]

FIG.18

REGISTER TRANSMISSION REQUEST DESTINATION OF SPECIFIC CLIENT

CLIENT IP

TRANSMISSION REQUEST DESTINATION OF SPECIFIC CLIENT

FAX TRANSMITTER IP

LINE NUMBER

CANCEL  NEXT  INPUT COMPLETED

FIG.25

REGISTER ADDRESS
  FAX ADDRESS
    TELEPHONE NUMBER [        ]
    TRANSMISSION REQUEST DESTINATION
      FAX TRANSMITTER IP [        ] ~281
        TRANSMISSION DESTINATION RANGE IP GROUP [        ] ~282
                                                [        ]
                                                [        ]
      LINE NUMBER [        ]
                                    [CANCEL]  [INPUT COMPLETED]

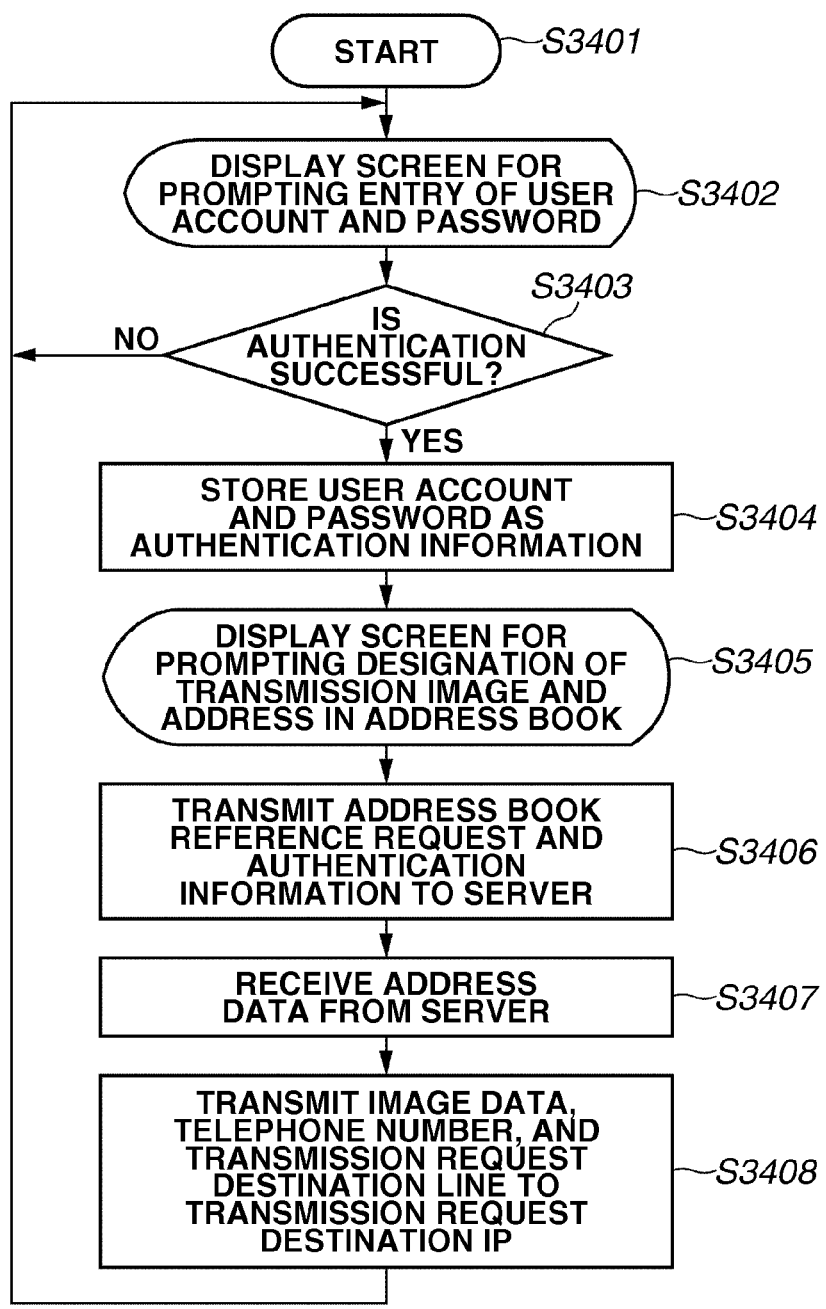

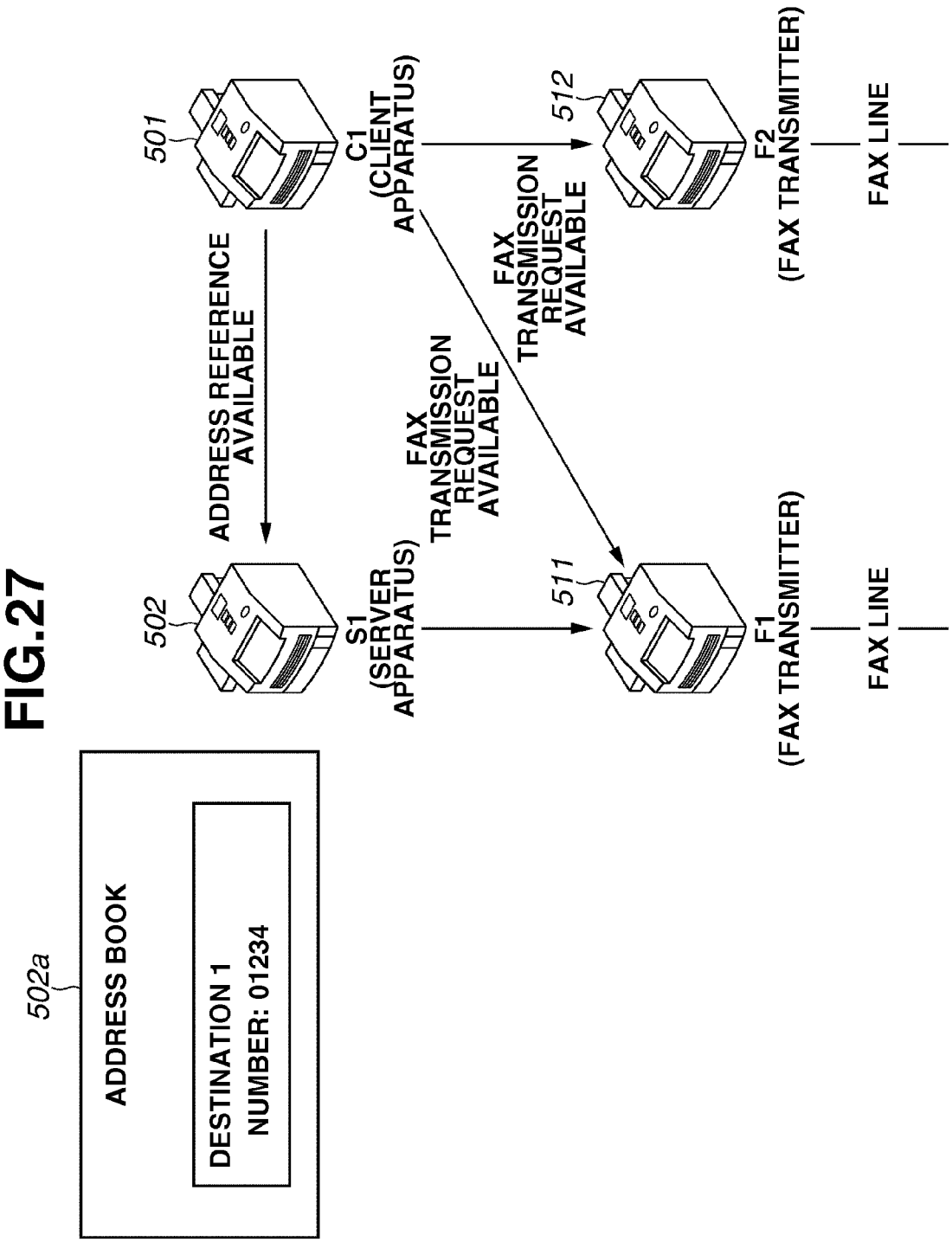

IMAGE PROCESSING APPARATUS, IMAGE PROCESSING METHOD, IMAGE PROCESSING SYSTEM, AND STORAGE MEDIUM

BACKGROUND OF THE INVENTION

1. Field of the Invention

The present invention relates to an image processing apparatus, an image processing method, and an image processing system in a network in which a plurality of devices, such as facsimile transmitters, having a function to receive an image transmission request is installed, and a storage medium storing a program for realizing the image processing method.

2. Description of the Related Art

Conventionally, a client apparatus can transmit image data and destination data to a server apparatus, and the sever apparatus can transmit the image data to a destination designated by the destination data (e.g., a system discussed in Japanese Patent Application Laid-Open No. 2006-222635). There has also been developed a system in which a client apparatus or a server apparatus includes a multifunctional peripheral (MFP).

The MFP includes an address book function to register destinations. As a technique for issuing a processing request from the client apparatus to the server apparatus in the MFP, a request to refer to an address book has been realized.

FIG. 27 illustrates a configuration example of a conventional network system.

The network system includes a client apparatus 501, a server apparatus 502, and a plurality of facsimile (FAX) transmitters 511 and 512. The server apparatus 502 includes an address book 502a, and the client apparatus 501 can refer to the address book 502a of the server apparatus 502.

In general transmission, information of a transmission source indicating a place from which data has been transmitted is added as an image header, or transmitted as data compliant with a protocol. In view of transfer setting of images or distribution of document images carried out by a receiver based on the transmission source information, it is desired that a specified transmission source be always selected to transmit data to a specified destination.

However, the conventional system has the following disadvantages.

(1) For example, in the example illustrated in FIG. 27, an administrator registers a telephone number "01234" of a destination in the address book 502a while intending to transmit data from the FAX transmitter 512. Nevertheless, when the client apparatus 501 refers to the address book 502a, the client apparatus 501 determines which of the FAX transmitters 511 and 512 is requested to transmit data. In other words, while there is a plurality of devices that can receive transmission requests, no method is available to register an address designating a place from which data is transmitted. In the example illustrated in FIG. 27, when an address is registered in the address book 502a of the server apparatus 502, which of the addresses designating transmission from the FAX transmitter 511 and transmission from the FAX transmitter 512 is used cannot be set.

(2) When there is a plurality of client apparatus that request transmission, the following operation is required. For example, it is presumed that a client apparatus for issuing a transmission request is installed for each department in an office. Even when the client apparatus transmit images to the same FAX transmitter, the FAX transmitter may be required to distribute transfer destinations of document images based on information of a transmission source. However, no method has conventionally been available to meet such a requirement.

(3) When the FAX transmitter side clearly carries out neither transfer setting nor distribution of document images, the client apparatus that issues a transmission request may be required to appropriately select a FAX transmitter. In other words, an operation for reducing standby time as much as possible is required irrespective of which of the plurality of FAX transmitters an image is transmitted from. Conventionally, however, no method to meet such a requirement has been available.

SUMMARY OF THE INVENTION

The present invention is directed to an image processing apparatus, an image processing method, an image processing system, and a storage medium storing a program, capable of achieving at least one of the following methods:

(1) the method capable of designating a transmission source when a destination is registered, and capable of always selecting a specified transmission source to transmit images to a specified destination;

(2) the method capable of designating a transmission source for each image processing apparatus that refers to a destination when the destination is registered, and capable of distributing transmission sources by the image processing apparatus; and (3) the method capable of appropriately selecting a transmission source from an image processing apparatus that can issue a transmission request to carry out transmission.

According to an aspect of the present invention, an image processing apparatus connected to a network in which a plurality of devices having a transmission request reception function for transmitting a transmission-requested image to a designated destination is installed and including an address book used for registering destination data indicating the designated destination includes an address registration unit configured to register, in the address book, transmission request destination data designating one of the plurality of devices and the destination data in association with each other, an address designation unit configured to designate the destination data registered by the address registration unit, an image designation unit configured to designate an image to be transmitted, and a transmission unit configured to transmit the image designated by the image designation unit and the destination data designated by the address designation unit to the device designated by the transmission request destination data associated with the destination data.

According to another aspect of the present invention, an image processing apparatus arranged in a network in which two or more devices each having a transmission request reception function for transmitting a transmission-requested image to a destination designated by destination data are connected, and configured to allow an address book to be referred to by another image processing apparatus in the network, includes an address registration unit configured to register, in the address book, the destination data and transmission request destination data designating one of the two or more devices in association with each other, a unit configured to receive a reference request of the address book from the another image processing apparatus, and a transmission unit configured to transmit, responsive to the reference request, the destination data and the transmission request destination data registered in the address book by the address designation unit to the another image processing apparatus, which has sent the reference request.

According to yet another aspect of the present invention, an image processing apparatus capable of communicating with a server apparatus arranged in a network in which two or more devices each having a transmission request reception function for transmitting a transmission-requested image to a destination designated by destination data are connected, and including an address book, includes an address designation unit configured to designate the destination data registered in the address book of the server apparatus and transmission request destination data indicating one of the two or more devices, a unit configured to transmit a reference request of the destination data and the transmission request destination data designated by the address designation unit to the server apparatus, a reception unit configured to receive the destination data and the transmission request destination data transmitted from the server apparatus based on the reference request, an image designation unit configured to designate an image to be transmitted, and a unit configured to transmit the image designated by the image designation unit and the destination data received by the reception unit to the device designated by the transmission request destination data received by the reception unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2A is a block diagram illustrating a configuration example of an image processing apparatus in FIG. 1.

FIG. 2B illustrates a configuration example of a FAX transmitter in FIG. 1.

FIG. 3 is a flowchart illustrating an operation of the image processing apparatus according to the first exemplary embodiment.

FIG. 10 illustrates an example of a screen for prompting determination of an operation to be performed when an address book is input from an external file.

FIG. 17 illustrates an example of a screen for prompting address registration.

FIG. 18 illustrates an example of a screen for prompting registration of a transmission request destination for each client apparatus.

FIG. 25 illustrates an example of a screen for prompting address book registration.

FIG. 26 is a flowchart illustrating an operation of a client apparatus according to the third exemplary embodiment.

FIG. 27 illustrates a configuration example of a conventional network system.

DETAILED DESCRIPTION OF THE EMBODIMENTS

Various exemplary embodiments, features, and aspects of the invention will be described in detail below with reference to the drawings.

Figure 1:
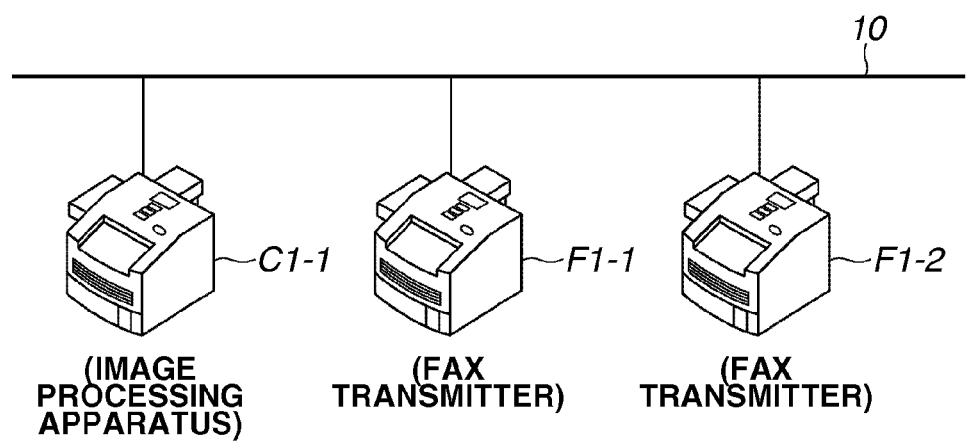
FIG. 1 illustrates a configuration example of an image processing system according to a first exemplary embodiment of the present invention.
Figure 4:
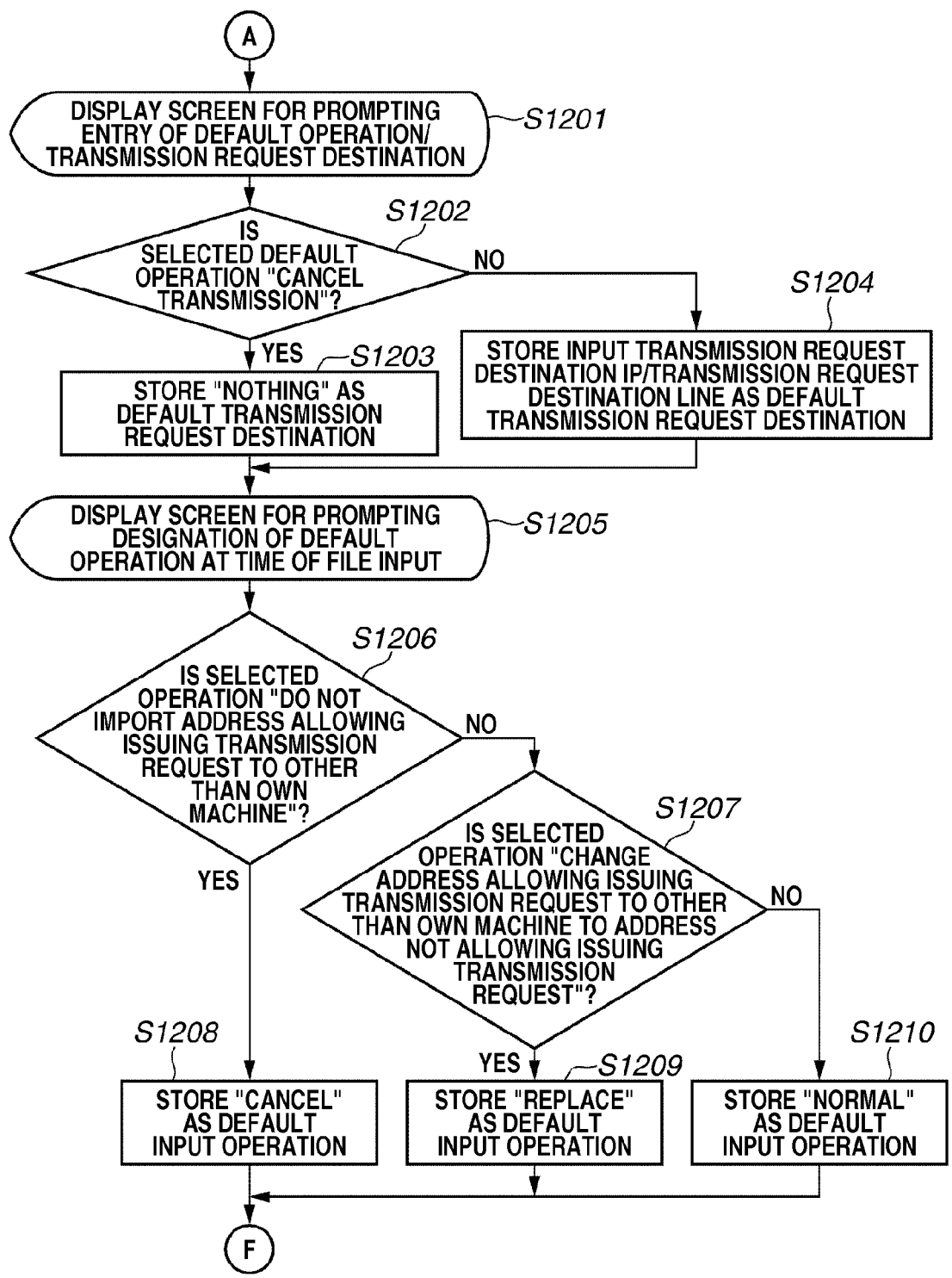
FIG. 4 is a flowchart illustrating an operation of the image processing apparatus according to the first exemplary embodiment.
Figure 5:
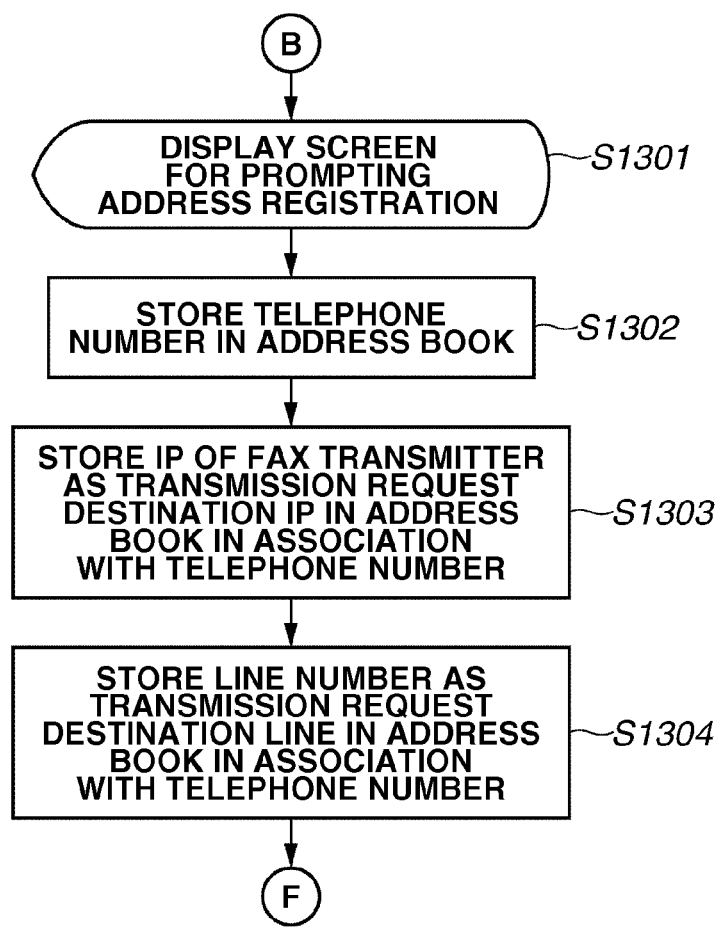
FIG. 5 is a flowchart illustrating an operation of the image processing apparatus according to the first exemplary embodiment.
Figure 6:
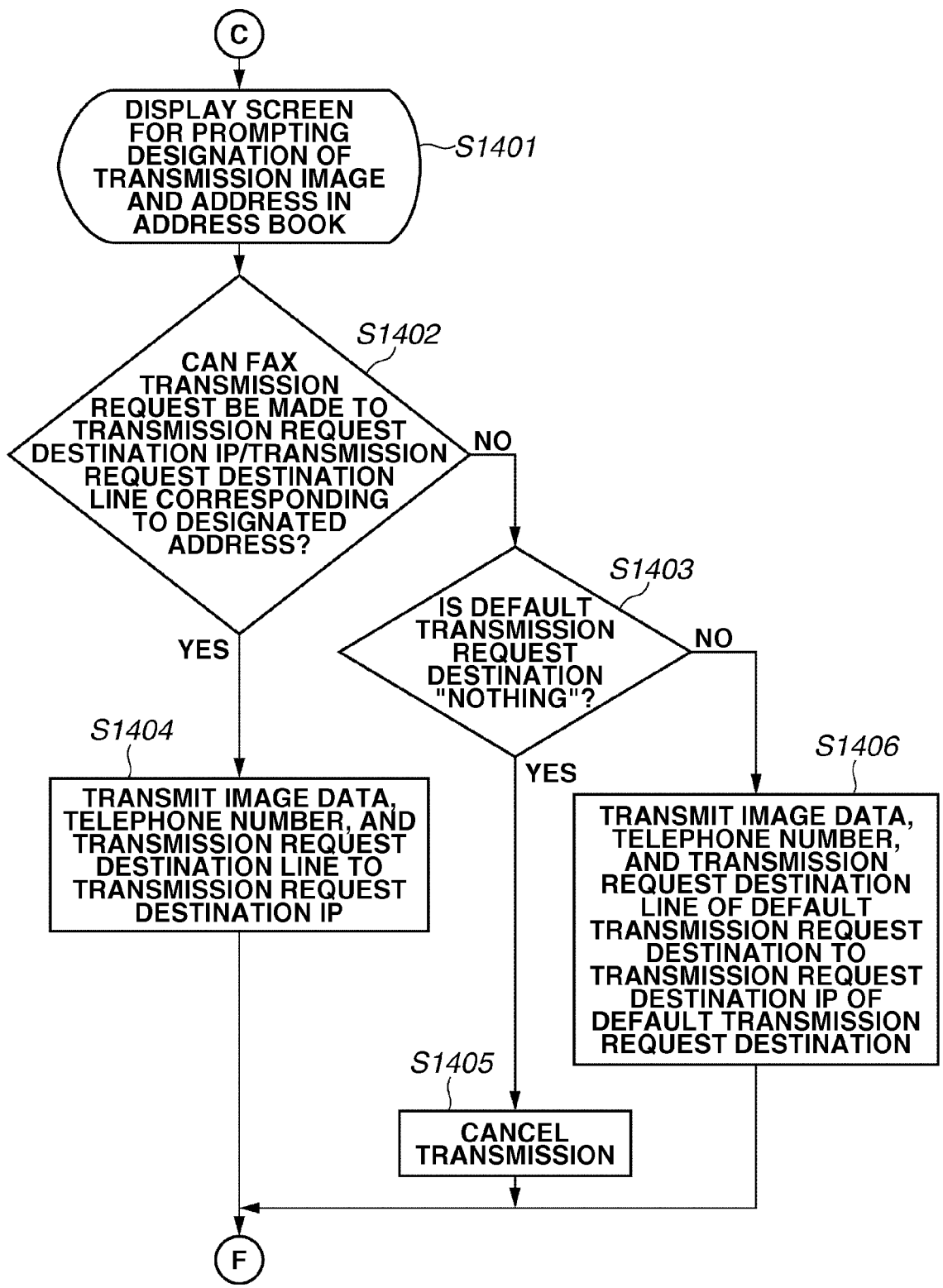
FIG. 6 is a flowchart illustrating an operation of the image processing apparatus according to the first exemplary embodiment.
Figure 7:
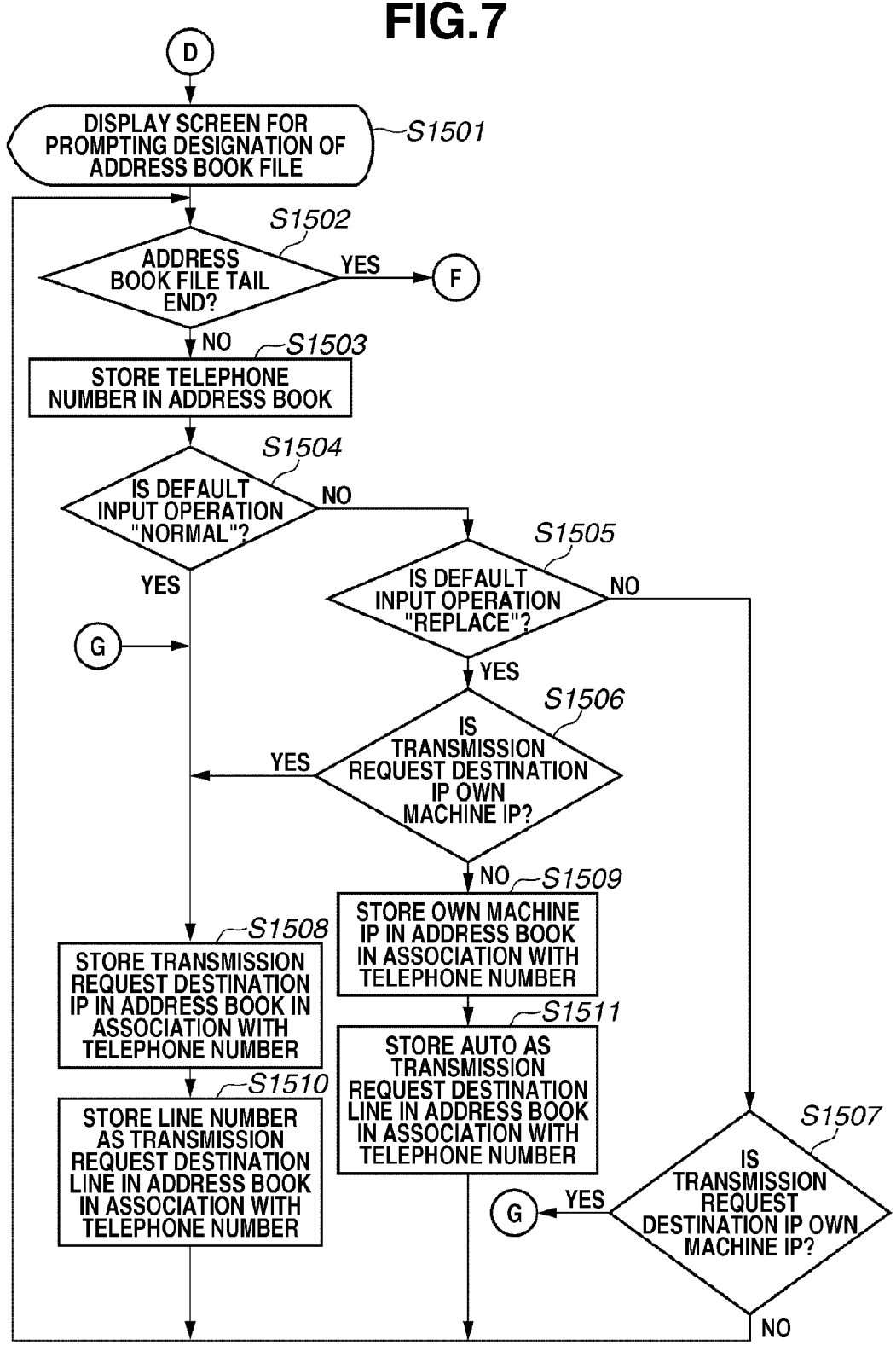
FIG. 7 is a flowchart illustrating an operation of the image processing apparatus according to the first exemplary embodiment.
Figure 8:
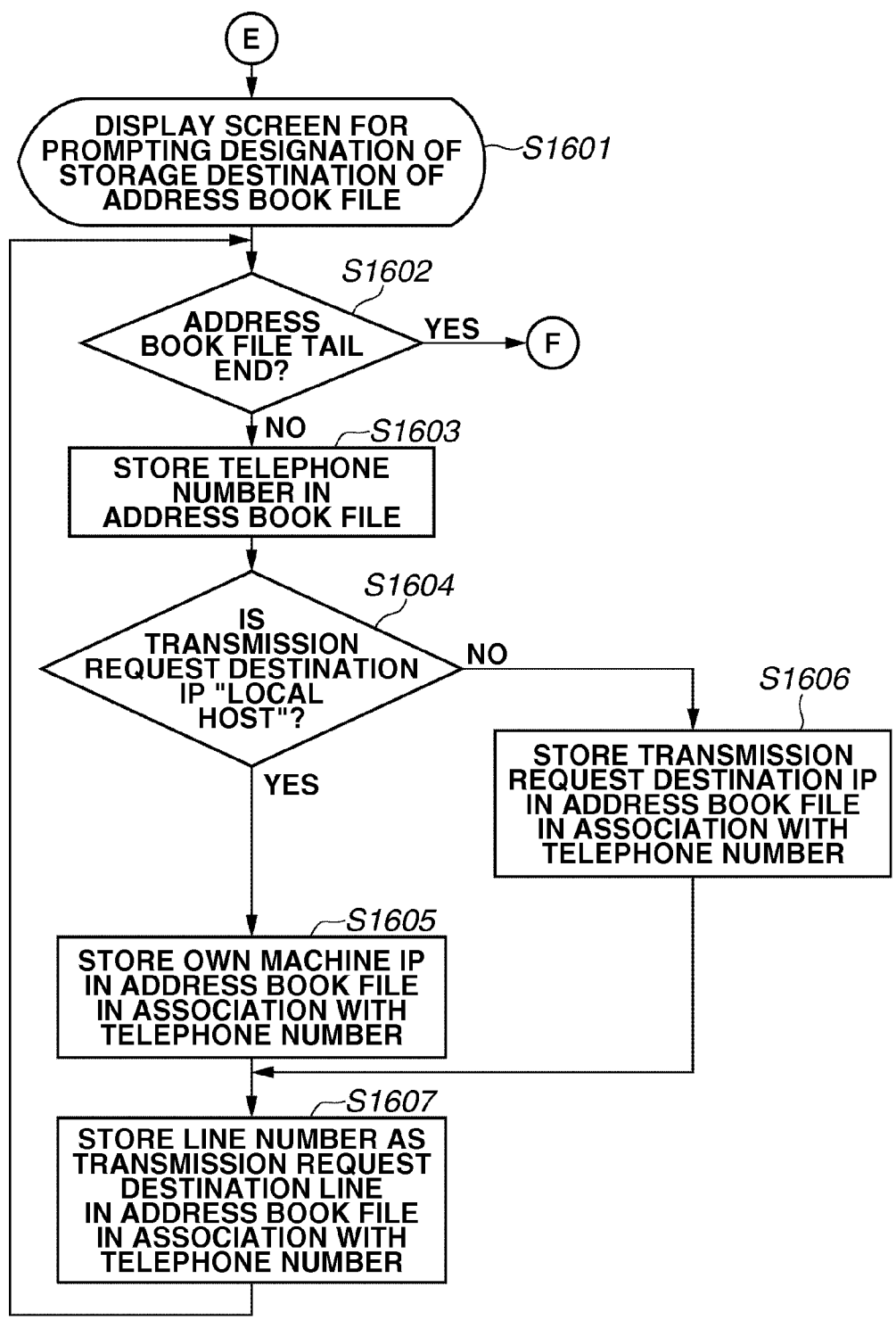
FIG. 8 is a flowchart illustrating an operation of the image processing apparatus according to the first exemplary embodiment.

FIG. 1 illustrates a configuration example of an image processing system according to a first exemplary embodiment of the present invention.

As illustrated in FIG. 1, the image processing system of the exemplary embodiment includes an image processing apparatus C1-1 and FAX transmitters F1-1 and F1-2, which are interconnected via a network line 10. The image processing apparatus C1-1 includes an address book used for registering destination data (e.g., telephone number) indicating a designated destination. The FAX transmitters F1-1 and F1-2 have transmission request reception functions for transmitting an image requested to be transmitted by the image processing apparatus C1-1 to a designated destination.

FIG. 2A is a block diagram illustrating a configuration example of the image processing apparatus C1-1 in FIG. 1.

The image processing apparatus C1-1 includes a central processing unit (CPU) 11, a random access memory (RAM) 12, a hard disk device 13, a user command input device 15, a user interface (UI) display device 16, a communication device 17, and a reading device 19, which are interconnected via a main bus 18. The CPU 11 controls an operation of the image processing apparatus C1-1 according to a program. The RAM 12 supplies a work area for the CPU 11, and the hard disk device 13 stores a program of the exemplary embodiment and various pieces of setting information. A floppy disk or a non-volatile random access memory (NVRAM) may be used in place of the hard disk device 13.

The user command input device 15 is used by a user (including a user and an installation user) to input a command, and includes a keyboard. The UI display device 16 includes a liquid crystal display. The reading device 19 includes a scanner for reading an image on paper as electronic data. The communication device 17 communicates with other devices via the network line 10.

FIG. 2B illustrates a configuration example of the FAX transmitter F1-1 or F1-2 in FIG. 1.

Each of the FAX transmitters F1-1 and F1-2 of the exemplary embodiment includes a CPU 21, a RAM 22, a hard disk device 23, a FAX transmission device 24, and a communication device 27, which are interconnected via a main bus 28.

The CPU 21 controls an operation of the FAX transmitter F1-1 or F1-2 according to a program. The RAM 22 supplies a work area for the CPU 21, and the hard disk device 23 stores a program of the exemplary embodiment and various pieces of setting information. A floppy disk or a NVRAM may be used in place of the hard disk device 23.

The FAX transmission device 24 communicates with other devices via a facsimile, and may include a plurality of lines. The communication device 27 communicates with other devices via the network line 10.

Next, referring to FIGS. 3 to 11, an operation of the image processing apparatus C1-1 of the exemplary embodiment will be described in detail. Each of FIGS. 3 to 8 is a flowchart illustrating the operation of the image processing apparatus C1-1 of the first exemplary embodiment. The CPU 11 reads program code stored in the hard disk device 13 to carry out this operation.

When the system of the exemplary embodiment is started in step S1101, the CPU 11 of the image processing device C1-1 prompts a user to input an operation to be performed in the UI display device 16. In step S1102, the CPU 11 recognizes an operation selection input by the user from the user command input device 15 and stores the operation selection in the RAM 12. Operations include, for example, "DESIGNATE DEFAULT OPERATION", "REGISTER IN ADDRESS BOOK", "EXECUTE FAX TRANSMISSION REQUEST", "INPUT ADDRESS BOOK FILE", and "OUTPUT ADDRESS BOOK FILE". In steps S1103 to S1107, the CPU 11 determines which of the operation is performed.

(A) Designate Default Operation

First, a case where operation determination is "DESIGNATE DEFAULT OPERATION" (YES in step S1103) will be described.

Figure 9:
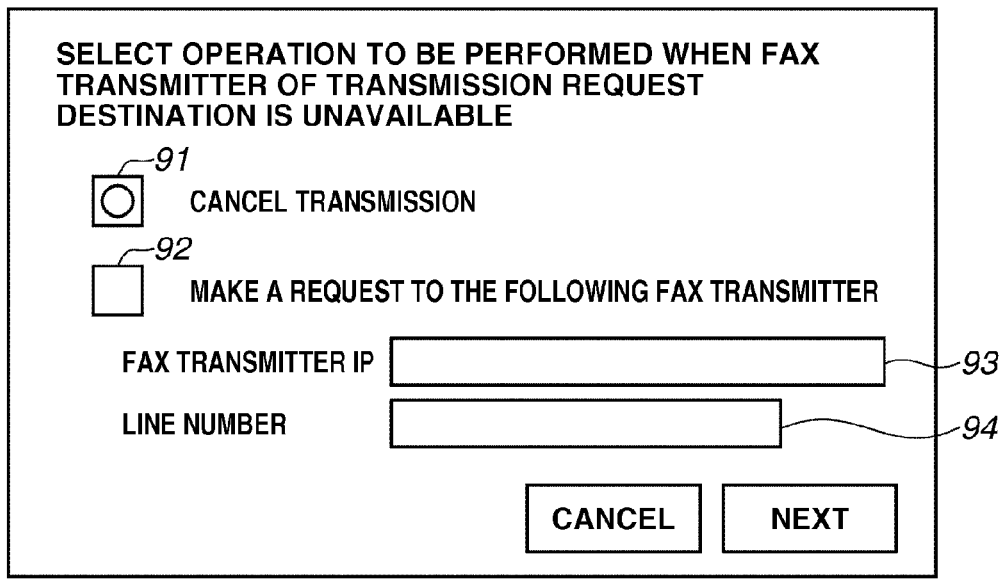
FIG. 9 illustrates an example of a screen for prompting determination of an operation to be performed when no transmission request can be made to a FAX transmitter of a transmission request destination.

In step S1201, the CPU 11 displays a screen on the UI display 16 for prompting determination of an operation to be performed when a FAX transmitter of a transmission request destination is unavailable. FIG. 9 illustrates an example of the screen. In step S1202, the CPU 11 receives a user input for this displaying from the user command input device 15 to determine which of "CANCEL TRANSMISSION" (91 in FIG. 9) and "MAKE A REQUEST TO THE FOLLOWING FAX TRANSMITTER" (92 in FIG. 9) the user input is.

If determination in step S1202 is "CANCEL TRANSMISSION" (YES in step S1202), the processing proceeds to step S1203. In step S1203, the CPU 11 stores "NOTHING" as a default transmission request destination in the hard disk device 13. Then, the processing proceeds to step S1205. If determination of step S1202 is "MAKE A REQUEST TO THE FOLLOWING FAX TRANSMITTER" (NO in step S1202), the processing proceeds to step S1204. In step S1204, the CPU 11 stores an IP address (93 in FIG. 9) and a line number (94 in FIG. 9) of the FAX transmitter input from the user command input device 15 as a default transmission request destination in the hard disk device 13. Data stored as transmission request destination IP includes, for example, "IP ADDRESS", "HOST NAME", and "LOCAL HOST" which is an identifier indicating an own machine. Data described hereinafter as transmission request destination IP in the exemplary embodiment can include such information. Then, the processing proceeds to step S1205. If none of steps S1202 to S1204 has been executed, "NOTHING" is stored as an initial value of a default transmission request destination in the hard disk device 13.

In step S1205, the CPU 11 displays a screen on the UI display 16 for prompting determination of an operation to be performed when an address book is input from an external file. FIG. 10 illustrates an example of the screen. In step S1206, the CPU 11 receives a user input for displaying from the user command input device 15 to determine whether the input is "DO NOT IMPORT ADDRESS ALLOWING ISSUING TRANSMISSION REQUEST TO OTHER THAN OWN MACHINE" (101 in FIG. 10). If determination in step S1206 is YES (YES in step S1206), the processing proceeds to step S1208. In step S1208, the CPU 11 stores "CANCEL" as a default input operation in the hard disk device 13. Then, the processing returns to step S1102.

If determination in step S1206 is NO (NO in step S1206), the processing proceeds to step S1207. In step S1207, the CPU 11 determines whether the input received from the user command input device 15 is "CHANGE ADDRESS ALLOWING ISSUING TRANSMISSION REQUEST TO OTHER THAN OWN MACHINE TO ADDRESS NOT ALLOWING ISSUING TRANSMISSION REQUEST" (102 in FIG. 10). If determination in step S1207 is YES (YES in step S1207), the processing proceeds to step S1209. In step S1209, the CPU 11 stores "REPLACE" as a default input operation in the hard disk device 13. Then, the processing returns to step S1102.

If determination in step S1207 is NO (NO in step S1207), the processing proceeds to step S1210. In this case, the input received from the user command input device 15 is an initial value "IMPORT ADDRESS DIRECTLY" (103 in FIG. 10). In other words, in step S1210, the CPU 11 stores "NORMAL" as a default input operation in the hard disk device 13. Then, the processing returns to step S1102. If none of steps S1206 to S1210 has been executed, the CPU 11 stores "NORMAL" as an initial value of a default input operation in the hard disk device 13.

(B) Register in Address Book

Next, a case where operation determination is "REGISTER IN ADDRESS BOOK" (YES in step S1104) will be described.

Figure 11:
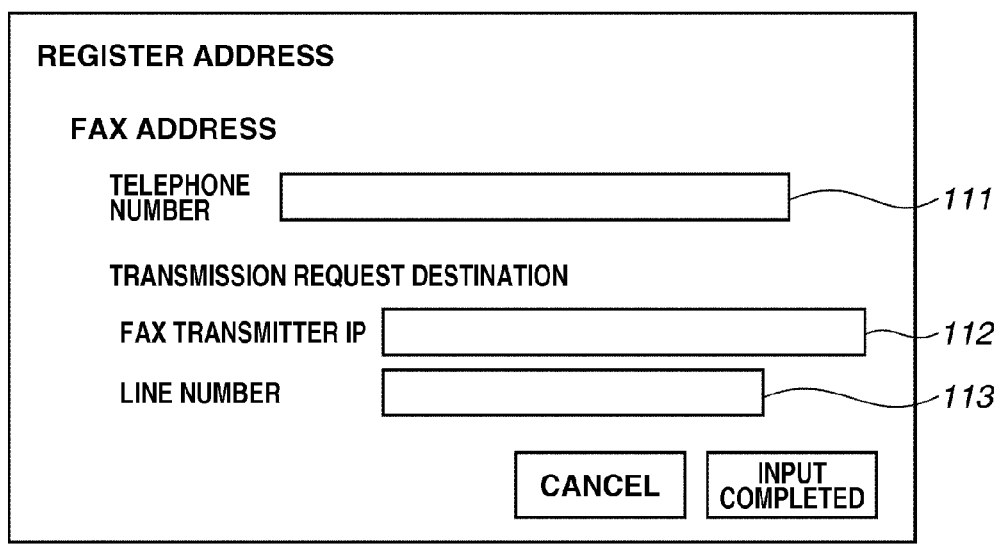
FIG. 11 illustrates an example of a screen for prompting address registration.

In step S1301, the CPU 11 displays a screen for prompting address registration in the UI display device 16. FIG. 11 illustrates an example of the screen. In step S1302, the CPU 11 receives a user input for displaying in step S1301 from the user command input device 15, and stores an input telephone number (111 in FIG. 11) as address data in the address book in the hard disk device 13. In step S1303, as in the case of step S1302, the CPU 11 stores an input IP address of the FAX transmitter (112 in FIG. 11) as a transmission request destination IP in association with the address data stored in step S1302. In step S1304, as in the case of step S1302, the CPU 11 stores an input line number (113 in FIG. 11) as a transmission request destination line in association with the address data stored in step S1302. Then, the processing returns to step S1102.

In the screen illustrated in FIG. 11, the CPU 11 can designate "LOCAL HOST", which is an identifier indicating the own machine, in addition to "IP ADDRESS" and "LINE NUMBER" of the FAX transmitter. "IP ADDRESS" and "LINE NUMBER" are absolute identifiers unique in the image processing system of the exemplary embodiment, and "LOCAL HOST" is a general-purpose identifier.

(C) Execute Fax Transmission Request

Next, a case where operation determination is "EXECUTE FAX TRANSMISSION REQUEST" (YES in step S1105) will be described.

In step S1401, the CPU 11 displays a screen for prompting designation of address data in the address book and a transmission image on the UI display device 16. In this case, the transmission image to be designated may be an image read from the reading device 19 or an image stored in the hard disk device 13. In step S1402, the CPU 11 obtains a transmission request destination IP of the designated address data and a transmission request destination line from the hard disk device 13 to determine whether a transmission request can be made. If determination in step S1402 is YES (YES in step S1402), the processing proceeds to step S1404. In step S1404, the CPU 11 transmits the designated image data, the telephone number of the designated address data, and the line number of the designated address data to the FAX transmitter of the IP address obtained from the transmission request destination IP. Then, the processing returns to step S1102.

If determination in step S1402 is NO (NO in step S1402), the processing proceeds to step S1403. In step S1403, the CPU 11 refers to the default transmission request destination stored in the hard disk device 13 to determine whether "NOTHING" has been stored. If determination in step S1403 is YES (YES in step S1403), the processing proceeds to step S1405. In step S1405, the CPU 11 cancels transmission. Then, the processing returns to step S1102.

If determination in step S1403 is NO (NO in step S1403), the processing proceeds to step S1406. The CPU 11 refers to the default transmission request destination stored in the hard disk device 13 to obtain data of a default transmission request destination IP and a default transmission request destination line. In step S1406, the CPU 11 transmits the designated image data, the telephone number of the designated address data, and the default transmission request destination line to the FAX transmitter of the IP address obtained from the default transmission request destination IP. Then, the processing returns to step S1102.

(D) Input Address Book File

Next, a case where operation determination is "INPUT ADDRESS BOOK FILE" (YES in step S1106) will be described.

In step S1501, the CPU 11 displays a screen for prompting designation of an address book file on the UI display device 16. The CPU 11 receives a user input for the displaying from the user command input device 15, and opens a designated file to scan the address book in the hard disk device 13. In step S1502, the CPU 11 determines whether scanning has reached a file tail end of the address book. If determination of step S1502 is YES (YES in step S1502), the CPU 11 closes the designated file, and the process returns to step S1102. If determination of step S1502 is NO (NO in step S1502), the processing proceeds to step S1503. In step S1503, the CPU 11 stores a telephone number stored in the file as address data in the address book in the hard disk device 13.

In step S1504, the CPU 11 refers to the default input operation stored in the hard disk device 13 to determine whether "NORMAL" has been stored. If determination of step S1504 is YES (YES in step S1504), the processing proceeds to step S1508. In step S1508, as in the case of step S1503, the CPU 11 stores an IP address of the FAX transmitter stored in the file as a transmission request destination IP in association with the address data stored in step S1503. In step S1510, as in the case of step S1503, the CPU 11 stores a line number of the FAX transmitter stored in the file as a transmission request destination line in association with the address data stored in step S1503. Then, the processing returns to step S1502. If determination of step S1504 is NO (NO in step S1504), the processing proceeds to step S1505. In step S1505, the CPU 11 refers to the default input operation stored in the hard disk device 13 to determine whether "REPLACE" has been stored. If determination of step S1505 is YES (YES in step S1505), the processing proceeds to step S1506. In step S1506, the CPU 11 determines whether the IP address of the FAX transmitter stored in the file matches an IP address of the own machine. If determination of step S1506 indicates that the transmission request destination IP matches the own machine IP (YES in step S1506), the processing proceeds to step S1508. If determination of step S1506 does not indicate that the transmission request destination IP matches the own machine IP (NO in step S1506), the processing proceeds to step S1509. In step S1509, as in the case of step S1503, the CPU 11 stores the IP address of the own machine in association with the address data stored in step S1503.

In step S1511, as in the case of step S1503, the CPU 11 stores "AUTO" as a transmission request destination line in association with the address data stored in step S1503. "AUTO" is a general-purpose identifier indicating that any line number can be used for the transmission request destination line. Then, the processing returns to step S1502. If determination of step S1505 is NO (NO in step S1505), the processing proceeds to step S1507. In step S1507, the CPU 11 determines whether the IP address of the FAX transmitter stored in the file matches the IP address of the own machine. If determination of step S1507 indicates that the transmission request destination IP matches the own machine IP (YES in step S1507), the processing proceeds to step S1508. If determination of step S1507 does not indicate that the transmission request destination IP matches the own machine IP (NO in step S1507), the processing returns to step S1502 without executing storage in the address book.

(E) Output Address Book File

Next, a case where operation determination "OUTPUT ADDRESS BOOK FILE" (YES in step S1107) will be described.

In step S1601, the CPU 11 displays a screen for prompting designation of an address book file output destination on the UI display device 16. The CPU 11 receives a user input for the displaying from the user command input device 15, and creates and opens a file in the designated output destination to scan the address book in the hard disk device 13. In step S1602, the CPU 11 determines whether scanning has reached a file tail end of the address book. If determination of step S1602 is YES (YES in step S1602), the CPU 11 closes the file of the output destination, and the processing returns to step S1102.

If determination of step S1602 is NO (NO in step S1602), the processing proceeds to step S1603. In step S1603, the CPU 11 stores a telephone number stored as address data in the address book in the hard disk device 13 as address data of the file of the output destination.

In step S1604, the CPU 11 determines whether a transmission request destination IP stored as address data in the address book is "LOCAL HOST". If determination of step S1604 is YES (YES in step S1604), the processing proceeds to step S1605. In step S1605, as in the case of step S1603, the CPU 11 stores the IP address of the own machine as a transmission request destination IP in the file of the output destination in association with the address data stored in step S1603. Then, the processing proceeds to step S1607.

If determination of step S1604 is NO (NO in step S1604), the processing proceeds to step S1606. In step S1606, the CPU 11 stores the IP address of the FAX transmitter stored as the address data in the address book as transmission request destination IP in the file of the output destination in association with the address data stored in step S1603. Then, the processing proceeds to step S1607. In step S1607, as in the case of step S1603, the CPU 11 stores a line number stored as address data in the address book as a transmission request destination line in the file of the output destination in association with the address data stored in step S1603. Then, the processing returns to step S1602.

According to the present exemplary embodiment, the image processing apparatus C1-1 registers, in the address book, a telephone number that is an image transmission destination (destination data) and an IP address and a line number of a FAX transmitter as the transmission request destination data in association with each other. The user designates an image to be transmitted, the destination data registered in the address book, and the transmission request destination data via the screen of the UI display device 16. Then, the image processing apparatus C1-1 transmits the designated image and the designated telephone number to the FAX transmitter designated by the transmission request destination data. Thus, the user can designate a transmission request destination at the time of making a transmission request, and the image processing apparatus C1-1 can determine a FAX transmitter that is a transmission request destination according to the designation.

As described above, the first exemplary embodiment provides a method for designating a transmission source (FAX transmitter) when the user registers a destination, thus enabling a specified transmission source to be always selected to transmit data to a specified destination.

In the present exemplary embodiment, the address book is set in the client apparatus, which is the image processing apparatus C1-1, and referred to. However, an address book to be referred to may be set in the server apparatus on the network to which the image processing apparatus C1-1 is connected. In this case, operations of the client apparatus and the server apparatus are similar to the operation of the image processing apparatus C1-1.

More specifically, the server apparatus registers, in the address book, a telephone number (destination data) that is an image transmission destination and an IP address and a line number of the FAX transmitter as transmission request destination data in association with each other. The server apparatus receives a reference request of the address book from the client apparatus. The server apparatus, responsive to the reference request, transmits the destination data and the transmission request destination data registered in the address book to the client apparatus C1-1, which has sent the reference request.

The client apparatus, which is an image processing apparatus, designates the destination data and the transmission request destination data registered in the address book, and transmits a reference request of the designated destination data and the transmission request destination data to the server apparatus. The client apparatus transmits an image designated to be transmitted and the destination data to a FAX transmitter designated by the transmission request destination data.

Figure 12:
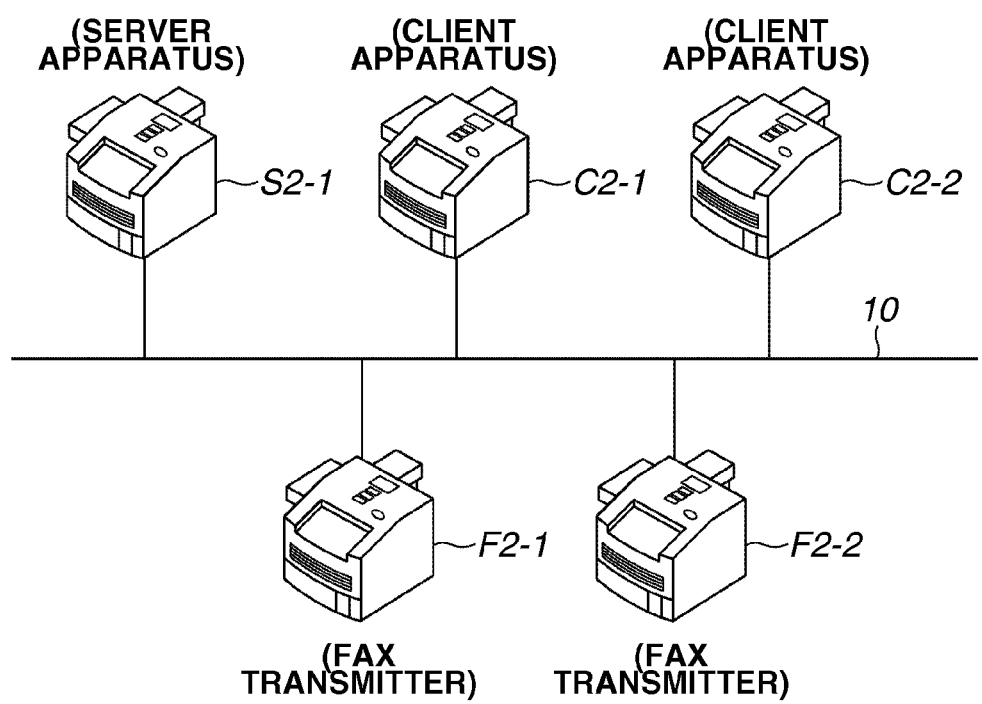
FIG. 12 illustrates a configuration example of an image processing system according to a second exemplary embodiment of the present invention.

FIG. 12 illustrates a configuration example of an image processing system according to a second exemplary embodiment of the present invention.

The image processing system of the present exemplary embodiment includes a plurality of image processing apparatuses for making transmission requests in a network. As illustrated in FIG. 12, the image processing system includes client apparatus C2-1 and C2-2, which are image processing apparatuses, a server apparatus S2-1, which includes an address book, and FAX transmitters F2-1 and F2-2, which are interconnected via a network line 10.

Figure 13:
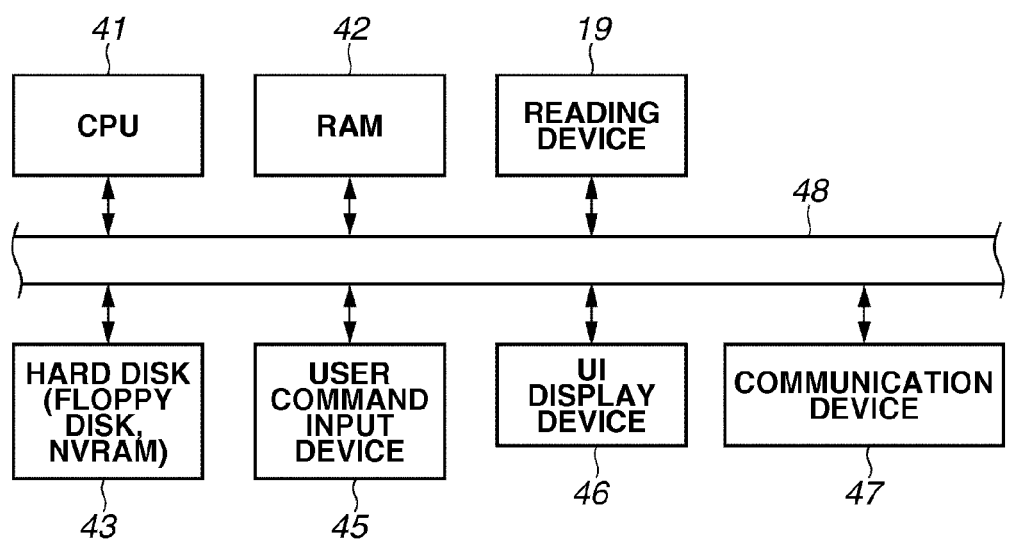
FIG. 13 is a block diagram illustrating a configuration example of a server apparatus in FIG. 12.

FIG. 13 is a block diagram illustrating a configuration example of the server apparatus S2-1 in FIG. 12.

The server apparatus S2-1 includes a CPU 41, a RAM 42, a hard disk device 43, a user command input device 45, a UI display device 46, and a communication device 47, which are interconnected via a main bus 48. The CPU 41 controls an operation of the server apparatus S2-1 according to a program. The RAM 42 supplies a work area for the CPU 41, and the hard disk device 43 stores a program of the exemplary embodiment and various pieces of setting information. A floppy disk or a NVRAM may be used in place of the hard disk device 43.

The user command input device 45 can be used by a user (including a user and an installation user) to input a command, and includes a keyboard. The UI display device 46 includes a liquid crystal display for displaying a screen. The communication device 47 communicates with other devices via the network line 10.

The client apparatus C2-1 and C2-2 in the present exemplary embodiment are similar in configuration to the image processing apparatus C1-1 in the first exemplary embodiment illustrated in FIG. 2A. The FAX transmitters F2-1 and F2-2 are similar in configuration to the FAX transmitters F1-1 and F1-2 illustrated in FIG. 2B.

Next, an operation of the server apparatus S2-1 in the second exemplary embodiment will be described.

Figure 14:
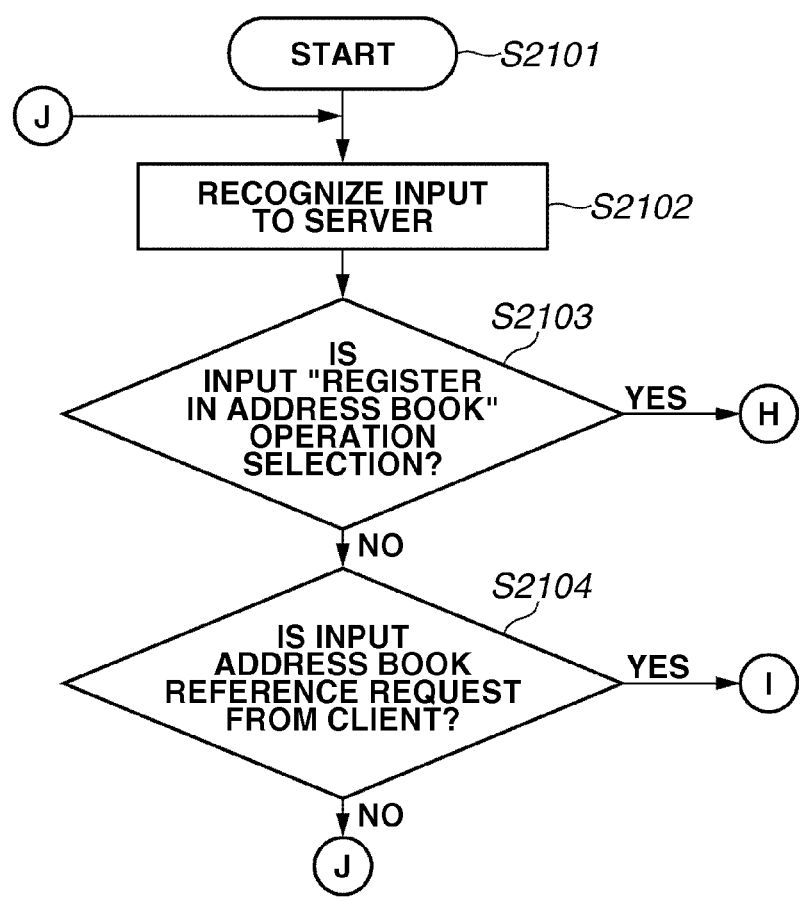
FIG. 14 is a flowchart illustrating an operation of the server apparatus according to the second exemplary embodiment.
Figure 15:
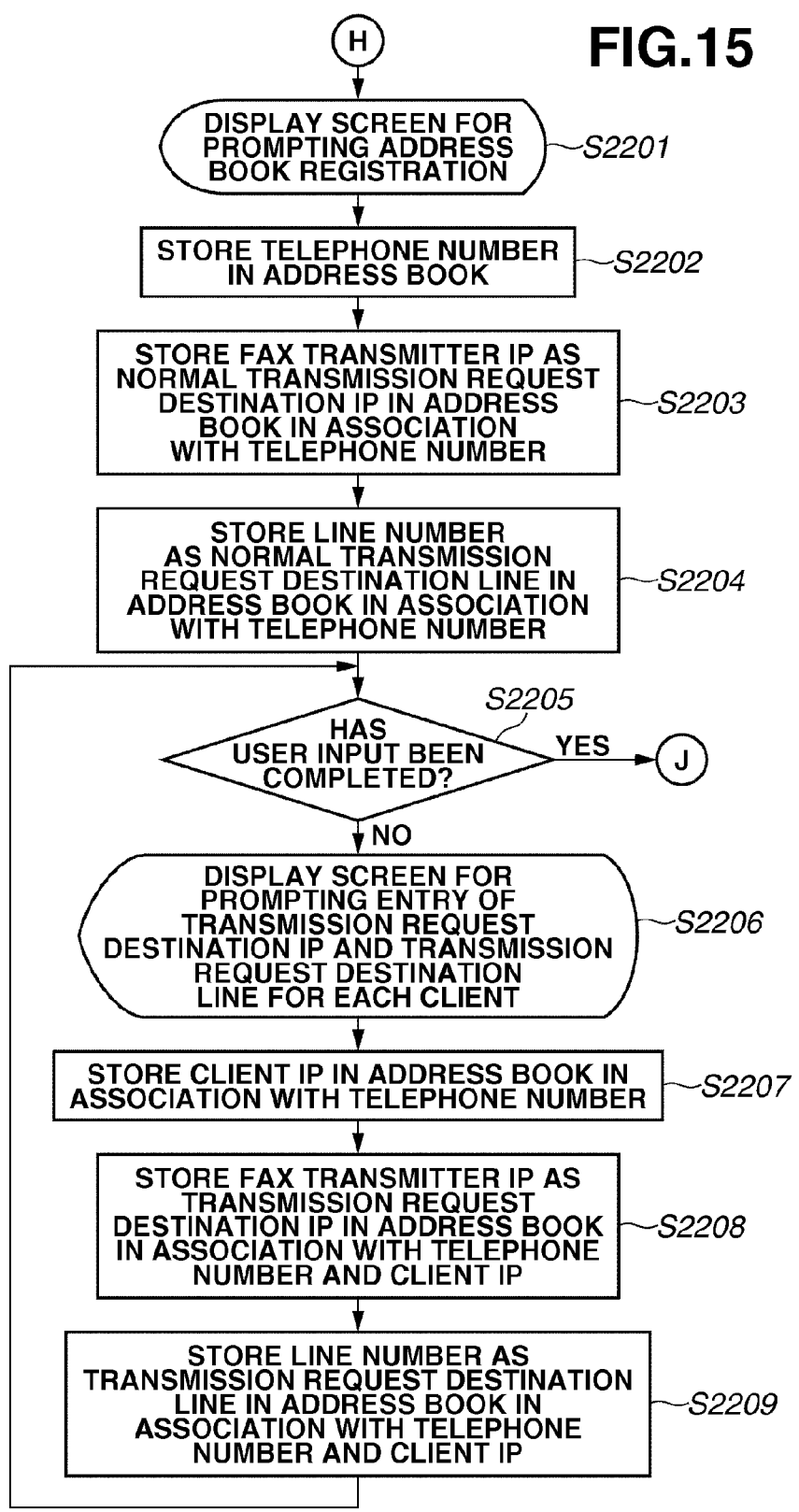
FIG. 15 is a flowchart illustrating an operation of the sever apparatus according to the second exemplary embodiment.
Figure 16:
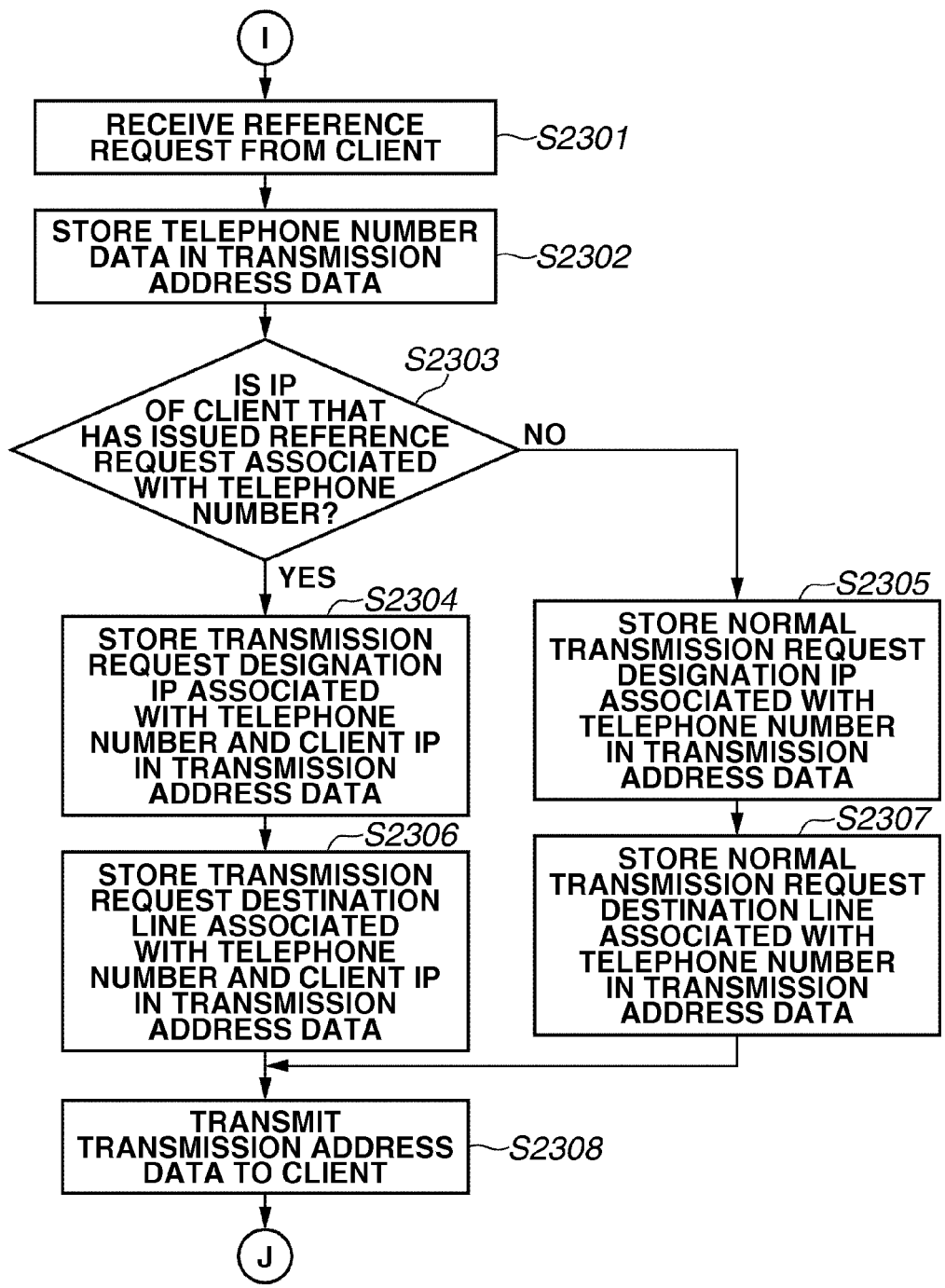
FIG. 16 is a flowchart illustrating an operation of the server apparatus according to the second exemplary embodiment.

Each of FIGS. 14 to 16 is a flowchart illustrating the operation of the server apparatus S2-1 in the second exemplary embodiment.

When the image processing system in the present exemplary embodiment is started in step S2101, then in step S2102, the CPU 41 of the server apparatus S2-1 recognizes a user input from the user command input device 45 or an input from the communication device 47. The input includes, for example, operation selection regarding "REGISTER IN ADDRESS BOOK" and a reference request of an address book from the client apparatus C2-1 or C2-2. In steps S2103 and S2104, the CPU 41 determines which of the inputs is performed.

(A) Register in Address Book

Next, a case where input determination is operation selection of "REGISTER IN ADDRESS BOOK" (YES in step S2103 in FIG. 14) will be described.

In step S2201, the CPU 41 of the server apparatus S2-1 displays a screen for prompting address book registration on the UI display device 46. FIG. 17 illustrates an example of the screen. On this screen, as illustrated in FIG. 17, a telephone number of a FAX transmitter that is a transmission request destination, and an IP address and a line number of the FAX transmitter can be input.

In step S2202, the CPU 41 receives a user input for displaying on the screen in FIG. 17 from the user command input device 45, and stores an input telephone number as address data in the address book in the hard disk device 43. In step S2203, as in the case of step S2202, the CPU 41 stores an input IP address of the FAX transmitter as a normal transmission request destination IP in association with the address data stored in step S2202. In step S2204, as in the case of step S2202, the CPU 41 stores an input line number as a normal transmission request destination line in association with the address data stored in step S2202.

In step S2205, the CPU 41 determines whether the user input received from the user command input device 45 is "INPUT COMPLETED". If determination of step S2205 is "INPUT COMPLETED", the processing returns to step S2102. If determination of step S2205 is not "INPUT COMPLETED", the processing proceeds to step S2206. In step S2206, the server apparatus S2-1 displays a screen for prompting registration of a transmission request destination for each client apparatus on the UI display device 46. FIG. 18 illustrates an example of the screen. On this screen, as illustrated in FIG. 18, the CPU 41 can input an IP address of the client apparatus, and an IP address and a line number of a FAX transmitter that is a transmission request destination. In step S2207, the CPU 41 receives a user input for displaying on the screen in FIG. 18 from the user command input device 45, and stores the input IP address of the client apparatus in the hard disk device 43 in association with the address data stored in step S2202.

In step S2208, the CPU 41 stores the input IP address of the FAX transmitter as a transmission request destination IP in association with the address data stored in step S2202 and the IP of the client apparatus stored in step S2207. In step S2209, the CPU 41 stores the input line number as a transmission request destination line in association with the address data stored in step S2202 and the IP of the client apparatus stored in step S2207. Then, the processing returns to step S2205.

(B) Address Book Reference Request

Next, a case where input determination is an address book reference request from the client apparatus C2-1 or C2-2 (YES in step S2104 in FIG. 14) will be described.

In step S2301 in FIG. 16, the CPU 41 of the server apparatus S2-1 receives a reference request from the client apparatus. In step S2302, The CPU 41 obtains address data designated by the reference request from the hard disk device 43 to store a telephone number as transmission address data in the RAM 42. In step S2303, the CPU 41 determines whether an IP address of the client apparatus stored in association with the designated address data matches an IP address of the client apparatus that has transmitted the reference request. If determination of step S2303 is YES, the processing proceeds to step S2304. In step S2304, the CPU 41 obtains a transmission request destination IP stored in association with the designated address data and the IP address of the client apparatus and stores the transmission request destination IP as transmission address data. In step S2306, the CPU 41 obtains a transmission request destination line stored in association with the designated address data and the IP address of the client apparatus and stores the transmission request destination line as transmission address data.

Then, the processing proceeds to step S2308. If determination of step S2305 is NO, the processing proceeds to step S2305. In step S2305, the CPU 41 obtains a normal transmission request destination IP and stores it as transmission address data. In step S2307, the CPU 41 obtains a normal transmission request destination line and stores it as transmission address data. Then, the processing proceeds to step S2308. In step S2308, the CPU 41 transmits the transmission address data to the client apparatus that has transmitted the reference request. Then, the processing returns to step S2102.

Figure 19:
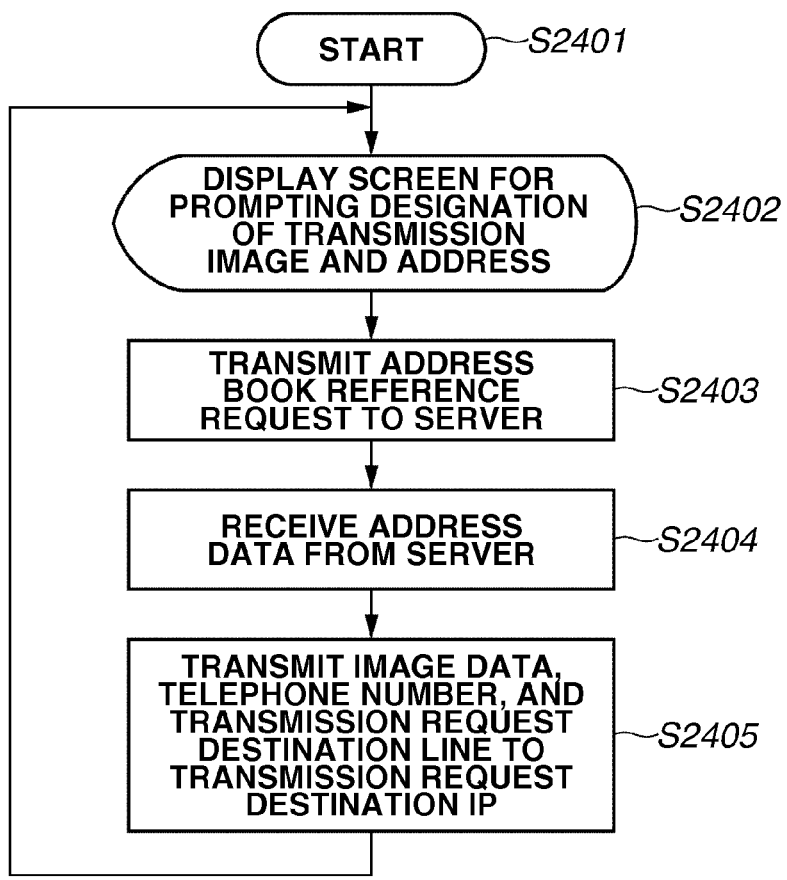
FIG. 19 is a flowchart illustrating an operation of the client apparatus according to the second exemplary embodiment.

FIG. 19 is a flowchart illustrating an operation of the client apparatus C2-1 according to the second exemplary embodiment. The operation of the client apparatus C2-2 is similar to that of the client apparatus C2-1, and thus description thereof will be omitted.

When the system of the exemplary embodiment is started in step S2401, then in step S2402, the CPU 41 of the client apparatus C2-1 displays a screen for prompting designation of an image to be transmitted and address data in the address book on the UI display device 46. In this case, the designated image to be transmitted may be an image read from the reading device 19 or an image stored in the hard disk device 43.

In step S2403, the CPU 41 transmits a reference request of the designated address data to the server apparatus S2-1. In step S2404, the CPU 41 waits for transmission of address data from the server apparatus S2-2 to receive the address data. In step S2405, the CPU 41 transmits designated image data, a telephone number of the designated address data, and a line number of the designated address data to a FAX transmitter of an IP address obtained from the transmission request destination IP. Then, the processing returns to step S2402.

According to the second exemplary embodiment, when the system includes a plurality of client apparatuses that make transmission requests, even if the client apparatuses transmit images to the same FAX transmitter, the FAX transmitter can distribute image transfer designations based on information of a transmission source.

Figure 20:
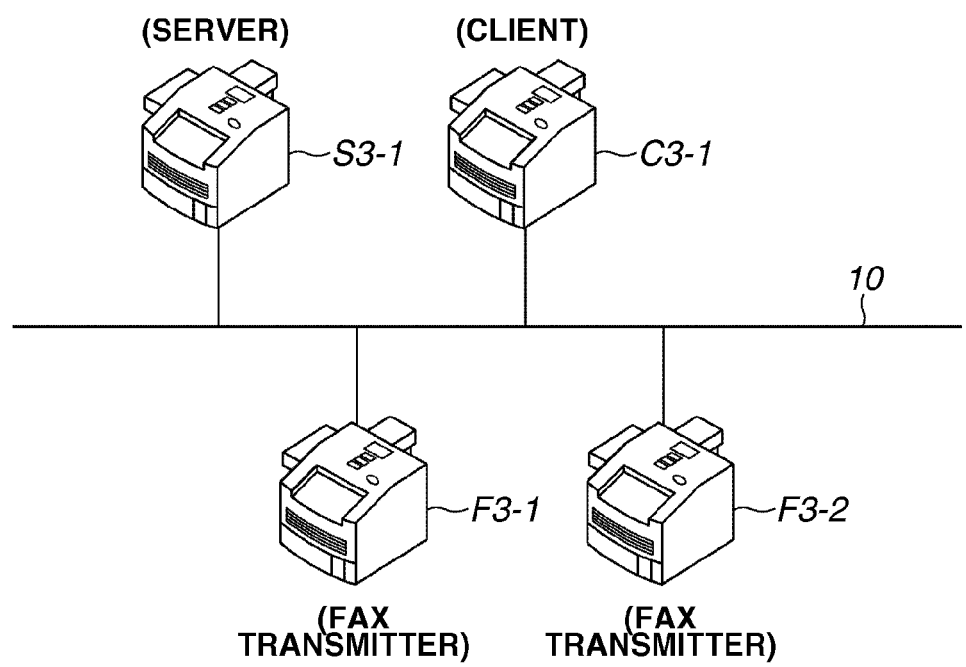
FIG. 20 illustrates a configuration example of an image processing system according to a third exemplary embodiment of the present invention.
Figure 21:
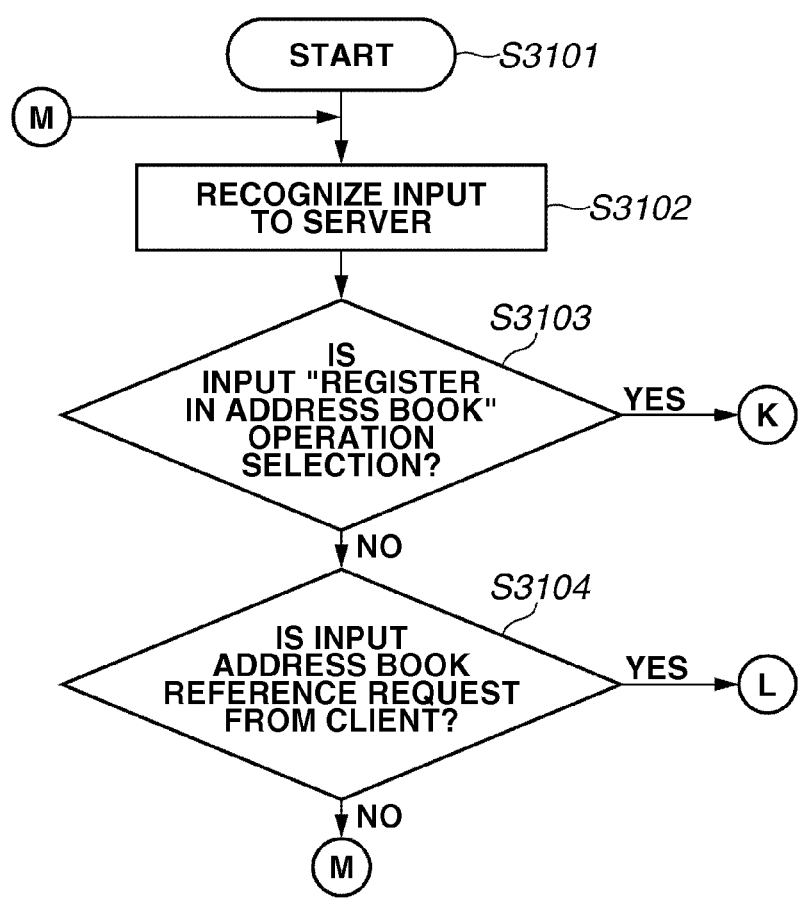
FIG. 21 is a flowchart illustrating an operation of a sever apparatus according to the third exemplary embodiment.

FIG. 20 illustrates a configuration example of an image processing system according to a third exemplary embodiment of the present invention.

As illustrated in FIG. 20, the image processing system in the present exemplary embodiment includes a client apparatus C3-1, which is an image processing apparatus, a server apparatus S3-1, which includes an address book, and FAX transmitters F3-1 and F3-2, which are interconnected via a network line 10.

The server apparatus S3-1 in the present exemplary embodiment is similar in configuration to the server apparatus S2-1 in the second exemplary embodiment illustrated in FIG. 13. The client apparatus C3-1 is similar in configuration to the image processing apparatus C1-1 in the first exemplary embodiment illustrated in FIG. 2A. The FAX transmitters F3-1 and F3-2 are similar in configuration to the FAX transmitters F1-1 and F1-2 illustrated in FIG. 2B.

Next, an operation of the server apparatus S3-1 in the third exemplary embodiment will be described.

Each of FIGS. 21 to 24 is a flowchart illustrating the operation of the server apparatus S3-1 in the third exemplary embodiment.

When the image processing system in the present exemplary embodiment is started in step S3101, then in steps S3102 to S3104, the CPU 41 of the server apparatus S3-1 executes processing similar to that of steps S2102 to S2104 illustrated in FIG. 14.

(A) Register in Address Book

Figure 22:
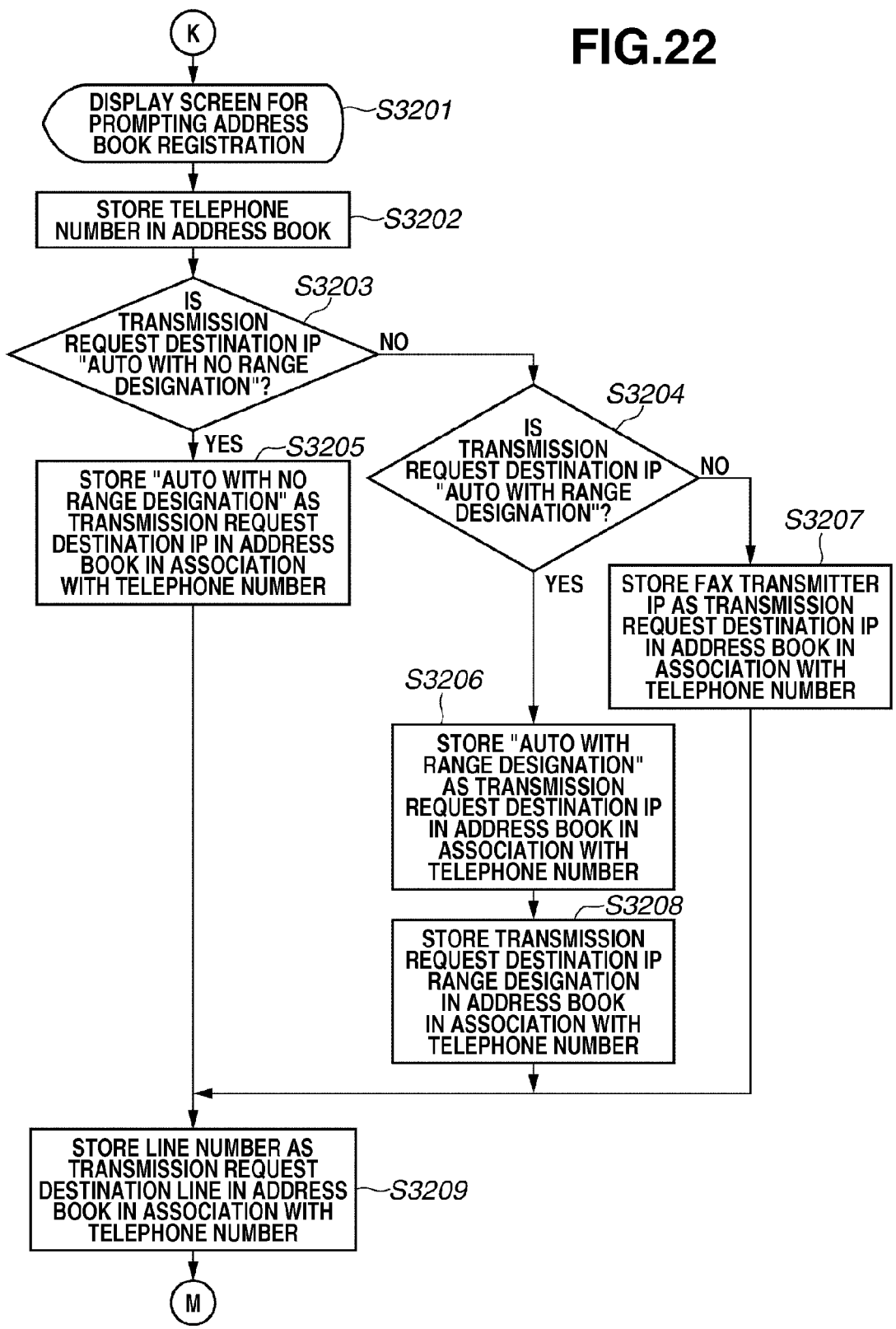
FIG. 22 is a flowchart illustrating an operation of the server apparatus according to the third exemplary embodiment.
Figure 23:
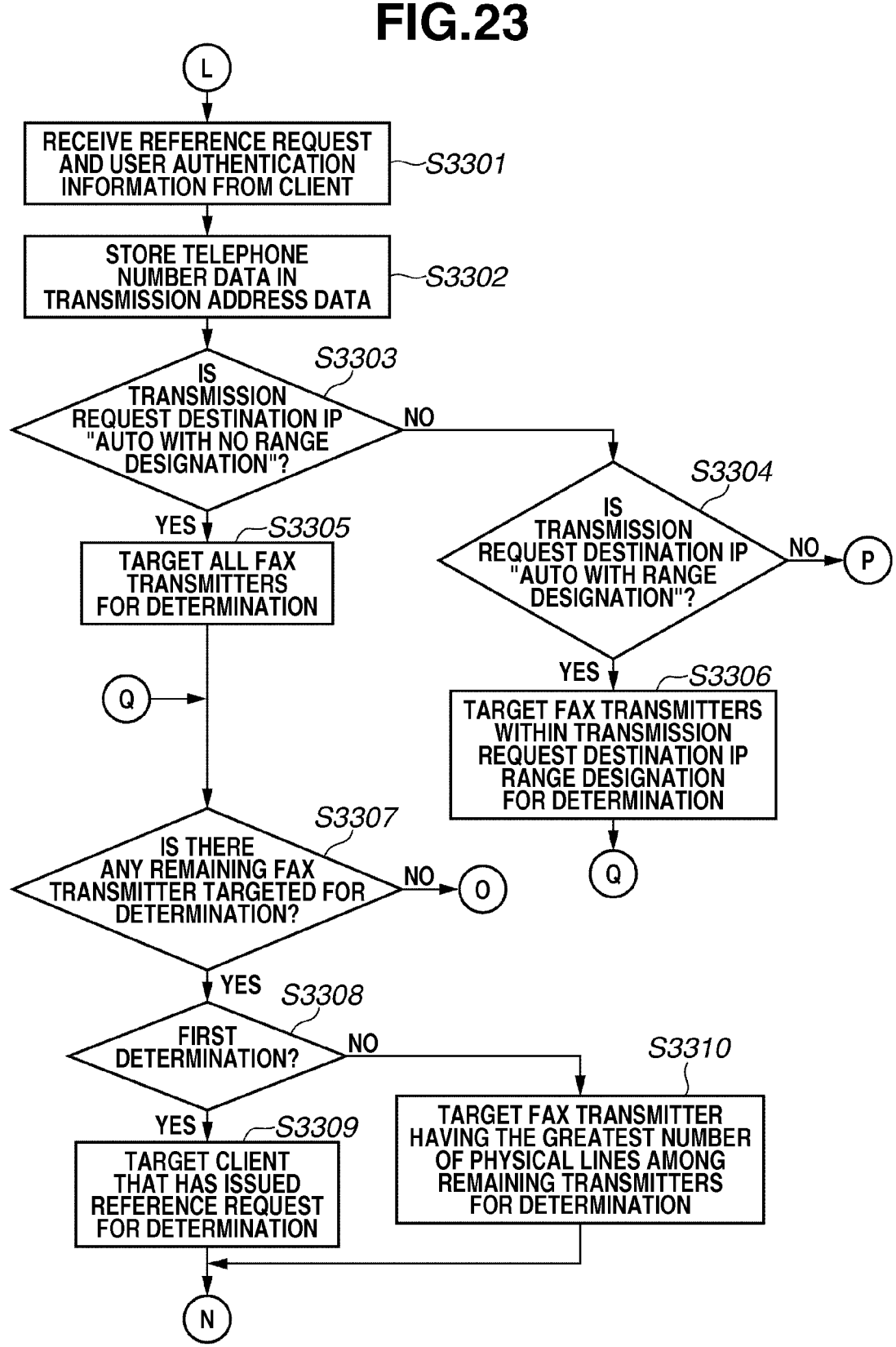
FIG. 23 is a flowchart illustrating an operation of the server apparatus according to the third exemplary embodiment.
Figure 24:
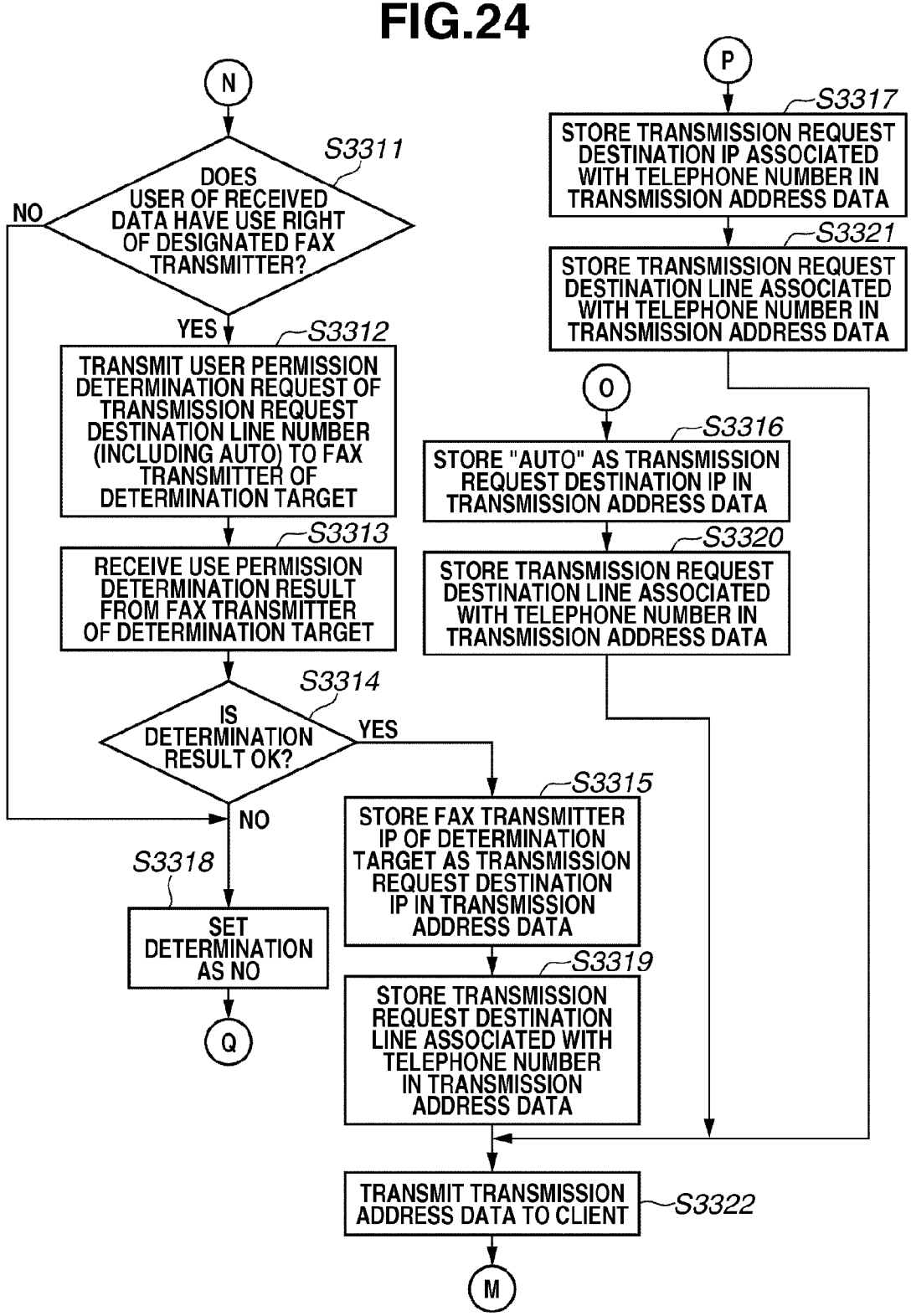
FIG. 24 is a flowchart illustrating an operation of the server apparatus according to the third exemplary embodiment.

A case where input determination is operation selection of "REGISTER IN ADDRESS BOOK" (YES in step S3103) will be described referring to a flowchart illustrated in FIG. 22.

In step S3201, the CPU 41 of the server apparatus S3-1 displays a screen for prompting address book registration on the UI display device 46. FIG. 25 illustrates an example of the screen. On this screen, data (281, 282) input as a transmission request transmission designation IP includes, for example, "IP ADDRESS", "HOST NAME", "AUTO WITH NO RANGE DESIGNATION", and "AUTO WITH RANGE DESIGNATION". "AUTO WITH NO RANGE DESIGNATION" is a dynamic selection identifier for dynamically selecting a FAX transmitter that is a request designation capable of receiving a transmission request irrespective of a transmission designation range during address reference. "AUTO WITH RANGE DESIGNATION" is a dynamic selection identifier for dynamically selecting a FAX transmitter among two or more request destinations (FAX transmitters) that can receive a transmission request from a plurality of predetermined FAX transmitters during address reference.

In step S3202, the CPU 41 receives a user input for displaying in step S3201 from the user command input device 75, and stores an input telephone number as address data in the address book in the hard disk device 73. In step S3203, the CPU 41 determines whether the input transmission request destination IP is "AUTO WITH NO RANGE DESIGNATION". If determination of step S3203 is YES (YES in step S3203), the processing proceeds to step S3205. In step S3205, the CPU 41 stores "AUTO WITH NO RANGE DESIGNATION" as a transmission request destination IP in association with the address data stored in step S3202.

Then, the processing proceeds to step S3209. If determination of step S3203 is NO (NO in step S3203), the processing proceeds to step S3204. In step S3204, the CPU 41 determines whether the input transmission request destination IP is "AUTO WITH RANGE DESIGNATION". If determination of step S3204 is YES (YES in step S3204), the processing proceeds to step S3206. In step S3206, the CPU 41 stores "AUTO WITH RANGE DESIGNATION" as a transmission request destination IP in association with the address data stored in step S3202.

In step S3208, the CPU 41 stores the input IP range destination as a transmission request destination IP range destination in association with the address data stored in step S3202. Then, the processing proceeds to step S3209. If determination of step S3204 is NO (NO in step S3204), the processing proceeds to step S3207. In step S3207, the CPU 41 stores an input IP address of the FAX transmitter as a transmission request destination IP in association with the address data stored in step S2202. Then, the processing proceeds to step S3209. In step S3209, the CPU 41 stores an input line number as a transmission request destination line in association with the address data stored in step S3202. Then, the processing returns to step S3102.

(B) Address Book Reference Request

Next, a case where input determination is an address reference request from the client apparatus C3-1 (YES in step S3104 in FIG. 21) will be described.

In step S3301, the CPU 41 of the server apparatus S3-1 receives a reference request and authentication information from the client apparatus C3-1. For the authentication information, for example, "USER ACCOUNT" or "USER PASSWORD" may be used. In step S3302, the CPU 41 obtains address data designated by the reference request from the hard disk device 73 and stores a telephone number as transmission address data in the RAM 42.

In step S3303, the CPU 41 determines whether a transmission request destination IP stored in association with the designated address data is "AUTO WITH NO RANGE DESTINATION". If determination of step S3303 is YES (YES in step S3303), the processing proceeds to step S3305. In step S3305, the CPU 41 designates all FAX transmitters that have been recognized by the server apparatus S3-1 as usability determination targets of FAX transmitters. Then, the processing proceeds to step S3307. If determination of step S3303 is NO (NO in step S3303), the processing proceeds to step S3304. In step S3304, the CPU 41 determines whether the transmission request destination IP stored in association with the designated address data is "AUTO WITH RANGE DES-IGNATION". If determination of step S3304 is YES (YES in step S3304), the processing proceeds to step S3306. In step S3306, the CPU 41 designates FAX transmitters within a range of the range designation of the transmission request destination IP as usability determination targets of FAX transmitters.

Then, the processing proceeds to step S3307. In step S3307, the CPU 41 determines whether there are still FAX transmitters of determination targets that have not been determined as unusable. If determination of step S3307 is YES (YES in step S3307), the processing proceeds to step S3308. In step S3308, the CPU 41 determines whether usability determination of the FAX transmitters is at the first time, and whether the client apparatus C3-1 that has transmitted a reference request includes a FAX transmitter. If determination of step S3308 is YES (YES in step S3308), the processing proceeds to step S3309. In step S3309, the CPU 41 designates the client apparatus C3-1 that has transmitted the reference request as a target being determined. Then, the processing proceeds to step S3311. If determination of step S3308 is NO (NO in step S3308), the processing proceeds to step S3310. In step S3310, the CPU 41 designates, among the FAX transmitters of transmission targets still left, a transmitter that has the greatest number of physical lines as an ongoing determination target.

Then, the processing proceeds to step S3311. In step S3311, the CPU 41 determines whether a user of the received authentication information data has a right to use the FAX transmitter of the ongoing determination target. If determination of step S3311 is YES (YES in step S3311), the processing proceeds to step S3312. In step S3312, the CPU 41 makes a determination result on usability of the transmission request destination line number of the designated address data to the FAX transmitter of the ongoing determination target. The transmission request destination line number may include "AUTO", which indicates any line.

Then, in step S3313, the CPU 41 receives the determination result of usability. In step S3314, the CPU 41 determines whether the determination result is OK. If determination of step S3314 is NO (NO in step S3314), the processing proceeds to step S3318. In step S3318, the CPU 41 adds a flag of NO determination to the FAX transmitter of the ongoing determination target. Then, the processing returns to step S3307. If determination of step S3311 is NO (NO in step S3311), the processing proceeds to step S3318. If determination of step S3314 is YES (YES in step S3314), the processing proceeds to step S3315.

In step S3315, the CPU 41 stores an IP of the FAX transmitter of the ongoing determination target as a transmission request destination IP of the transmission address data. In step S3319, the CPU 41 obtains a transmission request destination line stored in association with the designated address data and stores the transmission request destination line as transmission address data. The processing proceeds to step S3322. If determination of step S3307 is NO (NO in step S3307), the processing proceeds to step S3316. In step S3316, the CPU 41 stores "AUTO", which indicates that the client apparatus determines a transmission request destination, as a transmission request destination IP of the transmission address data.

In step S3319, the CPU 41 obtains a transmission request destination line stored in association with the designated address data and stores the transmission request destination line as transmission address data. Then, the processing proceeds to step S3322. If determination of step S3304 is NO (NO in step S3304), the processing proceeds to step S3317. In step S3317, the CPU 41 obtains the transmission request destination IP stored in association with the designated address data and stores the transmission request destination IP as transmission address data. In step S3321, the CPU 41 obtains the transmission request destination line stored in association with the designated address data and stores the transmission request destination line as transmission address data. Then, the processing proceeds to step S3322. In step S3322, the CPU 41 transmits the transmission address data to the client apparatus that has transmitted the reference request. Then, the processing returns to step S3102.

Next, referring to FIG. 26, an operation of the client apparatus in the third exemplary embodiment will be described.

FIG. 26 is a flowchart illustrating an operation of the client apparatus C3-1 in the present exemplary embodiment.

When the system of the exemplary embodiment is started in step S3401, then in step S3402, the CPU 11 of the client apparatus C3-1 displays a screen for prompting entry of a user account and a user password on the UI display device 16. In step S3403, the CPU 11 receives a user input for the displaying from the user command input device 15 to determine whether a user has a right to use FAX transmission request execution. If determination of step S3403 is YES (YES in step S3403), the processing proceeds to step S3404. In step S3404, the CPU 11 stores the user account and the user password that have been input as authentication information in the RAM 12.

In step S3405, the CPU 11 displays a screen for prompting designation of an image to be transmitted and address data in the address book on the UI display device 16. In this case, the designated image to be transmitted may be an image read from the reading device 19 or an image stored in the hard disk device 13. In step S3406, the CPU 11 transmits a reference request of the designated address data together with authentication information stored in step S3404 to the server apparatus S3-1.

In step S3407, the CPU 11 waits for transmission of address data from the server apparatus S3-1 to receive the address data. In step S3408, the CPU 11 transmits designated image data, a telephone number of the designated address data, and a line number of the designated address data to a FAX transmitter of an IP address obtained from the transmission request destination IP. Then, the processing returns to step S3402. If determination of step S3403 is NO (NO in step S3403), the processing returns to step S3402.

According to the present exemplary embodiment, as dynamic selection identifiers indicating selection of FAX transmitters that can receive transmission requests, for example, "AUTO WITH NO RANGE DESIGNATION" and "AUTO WITH RANGE DESIGNATION" are set. As a method for determining whether the device is permitted to receive a transmission request, the CPU determines whether the user has a right to use a FAX transmitter of an ongoing determination target. Thus, the client apparatus that makes a transmission request can appropriately select a FAX transmitter. In other words, an operation in which waiting time is reduced as much as possible is enabled irrespective of which of a plurality of FAX transmitters transmits an image.

The following processing is enabled in a device group which includes two or more devices (e.g., FAX transmitters) capable of receiving transmission requests and interconnected in a high-speed network. That is, whether a transmission request can be received may be determined while giving priority to devices in one of the device groups that has a greater number of devices.

The present invention can be achieved by executing the following processing. That is, a storage medium storing program code of software for realizing the functions of the exemplary embodiments is supplied to a system or an apparatus, and a computer (or CPU or MPU) of the system or the apparatus reads the program code stored in the storage medium.

In this case, the program code read from the storage medium realizes the functions of the exemplary embodiments, and the program code and the storage medium storing the program codes can constitute the present invention.

The storage medium for supplying the program code includes, for example, a floppy disk, a hard disk, an magneto-optical disk, a compact disc-read-only memory (CD-ROM), a CD-recordable (CD-R), a CD-rewritable (CD-RW), a digital versatile disc-ROM (DVD-ROM), a DVD-RAM, a DVD-RW, a DVD+RW, a magnetic tape, a nonvolatile memory card, and a ROM. Alternatively, the program code may be downloaded via a network.

A case where executing the program code read by the computer realizes the functions of the exemplary embodiments is within the present invention. In addition, a case where based on instructions of the program code, an operating system (OS) operating on the computer executes some or all parts of actual processing to realize the functions of the exemplary embodiment is within the invention.

A case where the functions of the exemplary embodiment are realized by the following processing is within the present invention. That is, the program code read from the storage medium is written in a memory mounted in a function extension board inserted into the computer or a function extension unit connected to the computer. Then, based on instructions of the program code, a CPU mounted in the function extension board or the function extension unit executes some or all parts of actual processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-172244 filed Jul. 1, 2008, which is hereby incorporated by reference herein in its entirety.

What is claimed is:

1. An image processing apparatus capable of communicating with a plurality of devices, the image processing apparatus comprising:

a registration unit configured to register a plurality of phone numbers, at least one of the plurality of telephone numbers being corresponding to an IP address or a host name for requesting an external device to transmit an image;

a designation unit configured to designate one of the plurality of telephone numbers registered by the registration unit;

a scanning unit configured to scan an original and to generate an image corresponding to the scanned original; and a transmission control unit configured to transmit, in a case where the designated phone number corresponds to an IP address or a host name for requesting an external device to transmit an image, the image and the designated telephone number to the external device indicated by the IP address or the host name, to which the designated telephone number corresponds, and configured to transmit, in a case where the designated phone number corresponds to not an IP address or a host name but information indicating own apparatus (LOCAL HOST), the image to the phone number by its own, wherein, in a case where it is not possible to transmit the image and the telephone number to the external device, the transmission unit is configured to transmit the image to the telephone number by its own, to a predetermined device, the image generated by the scanning unit and the telephone number designated by the designation unit.

2. The image processing apparatus according to claim 1, wherein the registration unit is configured to register a general-purpose identifier, which is a general-purpose identifier indicating the device, and an absolute identifier, which is a unique identifier indicating the device, as the IP address or the host name, further comprising:

an identifier determination unit configured to determine whether the IP address or the host name registered by the registration unit is the general-purpose identifier;

an identifier conversion unit configured to convert, when the IP address or the host name is determined to be the general-purpose identifier by the identifier determination unit, the general-purpose identifier into the absolute identifier; and an address book output unit configured to output address book output data obtained by combining destination data registered by the registration unit with the absolute identifier as the IP address or the host name associated with the destination data.

3. The image processing apparatus according to claim 1, further comprising:

an identifier determination unit configured to determine whether the IP address or the host name obtained by combining destination data with the IP address or the host name is an absolute identifier that is a unique identifier indicating the device;

a unit configured to replace, when the IP address or the host name is determined to be the absolute identifier by the identifier determination unit, the absolute identifier by a general-purpose identifier indicating the device; and a unit configured to register the replaced general-purpose identifier and the destination data.

4. The image processing apparatus according to claim 1, further comprising:

a unit configured to determine whether a request to the device designated by the IP address or the host name is unavailable; and a unit configured to cancel a transmission request when the request is determined to be unavailable.

5. The image processing apparatus according to claim 1, further comprising:

a unit configured to determine whether a request to the device designated by the IP address or the host name is unavailable; and a unit configured to designate, when the request is determined to be unavailable, a device to which a request is made.

6. An image processing method for an image processing apparatus communicating with a plurality of devices, the method comprising:

registering a plurality of telephone numbers, at least one of the plurality of telephone numbers being corresponding to an IP address or a host name for requesting an external device to transmit an image;

designating one of the registered plurality telephone numbers;

scanning an original;

generating an image corresponding to the scanned original; and transmitting, in a case where the designated phone number corresponds to an IP address or a host name for requesting an external device to transmit an image, the image and the designated telephone number to the external device which is indicated by the IP address or the host name, to which the designated telephone number corresponds, and transmitting, in a case where the designated phone number corresponds to not an IP address or a host name but information indicating own apparatus (LOCAL HOST), the image to the phone number by its own, wherein, in a case where it is not possible to transmit the image and the telephone number to the external device, the transmitting transmits the image to the telephone number by its own.

7. A non-transitory computer-readable storage medium storing a program to execute an image processing method for an image processing apparatus communicating with a plurality of devices, the program comprising:

registering a plurality of telephone numbers, at least one of the plurality of telephone numbers being corresponding to an IP address or a host name for requesting an external device to transmit an image;

designating one of the registered plurality of telephone numbers;

scanning an original;

generating an image corresponding to the scanned original; and transmitting, in a case where the designated phone number corresponds to an IP address or a host name for requesting an external device to transmit an image, the image and the designated telephone number to the external device, which is indicated by the designated IP address or the host name, to which the designated telephone number corresponds, and transmitting, in a case where the designated phone number corresponds to not an IP address or a host name but information indicating own apparatus (LOCAL HOST), the image to the phone number by its own, wherein, in a case where it is not possible to transmit the image and the telephone number to the external device, the transmitting transmits the image to the telephone number by its own.

8. The image processing method according to claim 6, wherein the registering registers a general-purpose identifier, which is a general-purpose identifier indicating the device, and an absolute identifier, which is a unique identifier indicating a device, as the IP address or the host name, further comprising:

determining whether the IP address or the host name registered by the registering is the general-purpose identifier;

converting, when the IP address or the host name is determined to be the general-purpose identifier, the general-purpose identifier into the absolute identifier; and outputting address book output data obtained by combining destination data registered by the registering with the absolute identifier as the IP address or the host name associated with the destination data.

9. The image processing method according to claim 6, further comprising:

determining whether the IP address or the host name obtained by combining destination data with the IP address or the host name is an absolute identifier that is a unique identifier indicating a device;

replacing, when the IP address or the host name is determined to be the absolute identifier, the absolute identifier by a general-purpose identifier indicating a device; and registering the replaced general-purpose identifier and the destination data.

10. The image processing method according to claim 6, further comprising:

determining whether a request to a device designated by the IP address or the host name is unavailable; and cancelling a transmission request when the request is determined to be unavailable.

11. The image processing method according to claim 6, further comprising:

determining whether a request to a device designated by the IP address or the host name is unavailable; and designating, when the request is determined to be unavailable, a device to which a request is made.

12. The computer readable storage medium according to claims 7, wherein the registering registers a general-purpose identifier, which is a general-purpose identifier indicating the device, and an absolute identifier, which is a unique identifier indicating a device, as the IP address or the host name, further comprising:

determining whether the IP address or the host name registered by the registering is the general-purpose identifier;

converting, when the IP address or the host name is determined to be the general-purpose identifier, the general-purpose identifier into the absolute identifier; and outputting address book output data obtained by combining destination data registered by the registering with the absolute identifier as the IP address or the host name associated with the destination data.

13. The computer readable storage medium according to claim 7, further comprising:

determining whether the IP address or the host name by combining destination data with the IP address or the host name is an absolute identifier that is a unique identifier indicating a device;

replacing, when the IP address or the host name is determined to be the absolute identifier, the absolute identifier by a general-purpose identifier indicating a device; and registering the replaced general-purpose identifier and the destination data.

14. The computer readable storage medium according to claim 7, further comprising:

determining whether a request to a device designated by the IP address or the host name is unavailable; and cancelling a transmission request when the request is determined to be unavailable.

15. The computer readable storage medium according to claim 7, further comprising:

determining whether a request to a device designated by the IP address or the host name is unavailable; and designating, when the request is determined to be unavailable, a device to which a request is made.

\* \* \* \* \*